United States Patent [19]

Takiyasu et al.

[11] Patent Number: 5,247,518
[45] Date of Patent: Sep. 21, 1993

[54] HIGH-SPEED RING LAN SYSTEM

[75] Inventors: Yoshihiro Takiyasu, Higashimurayama; Toshiki Tanaka, Ome; Taihei Suzuki, Kodaira; Eiichi Amada, Tokyo; Yukiji Yamauchi, Suita; Mitsuhiro Yamaga, Kawasaki; Matsuaki Terada, Machida; Kunio Hiyama, Fujisawa, all of Japan

[73] Assignee: Hitachi, Ltd., Tokyo, Japan

[21] Appl. No.: 819,821

[22] Filed: Jan. 13, 1992

Related U.S. Application Data

[63] Continuation of Ser. No. 339,901, Aug. 29, 1989, Pat. No. 5,103,447.

[30] Foreign Application Priority Data

Sep. 2, 1988 [JP] Japan ................................. 63-218310
Jan. 25, 1989 [JP] Japan ................................. 1-013910

[51] Int. Cl.⁵ ...................... H04L 12/42; H04L 12/56
[52] U.S. Cl. .................... 370/85.15; 370/94.1; 370/94.2; 370/55
[58] Field of Search ................ 370/85.15, 85.12, 85.5, 370/85.13, 94.1, 94.2, 60, 60.1, 55

[56] References Cited

U.S. PATENT DOCUMENTS

| | | | |
|---|---|---|---|
| 4,569,041 | 2/1986 | Takeuchi et al. | 370/85.12 |
| 4,716,561 | 12/1987 | Angell et al. | 370/55 |
| 4,809,267 | 2/1989 | Higuchi et al. | 370/85.15 |
| 4,858,232 | 8/1989 | Diaz et al. | 370/85.15 |

Primary Examiner—Douglas W. Olms
Assistant Examiner—Hassan Kizou
Attorney, Agent, or Firm—Antonelli, Terry, Stout & Kraus

[57] ABSTRACT

A high-speed ring LAN capable of accommodating at least one public network having a signal transmission rate of 155.57 MHz, and at least one sub-LAN having a signal transmission rate of 100 MHz. The high-speed LAN has a signal transmission rate of 155.52 Mbps ×n (n is an even number). SONET (Synchronous Optical NETwork) subframes each comprising a 9 bytes ×9 section overhead area and a 261 bytes ×9 virtual container 4 (VC-4) area flow in a time-divisional n-multiplexed format. The respective node devices inserted in the transmission path have one or more ports to accommodate sub-LANs or public networks. Information is exchanged in units of a fixed-length packet between a received SONET subframe and an asynchronous port whereas information is exchanged in units of a byte between the SONET subframe and a synchronous port.

25 Claims, 19 Drawing Sheets

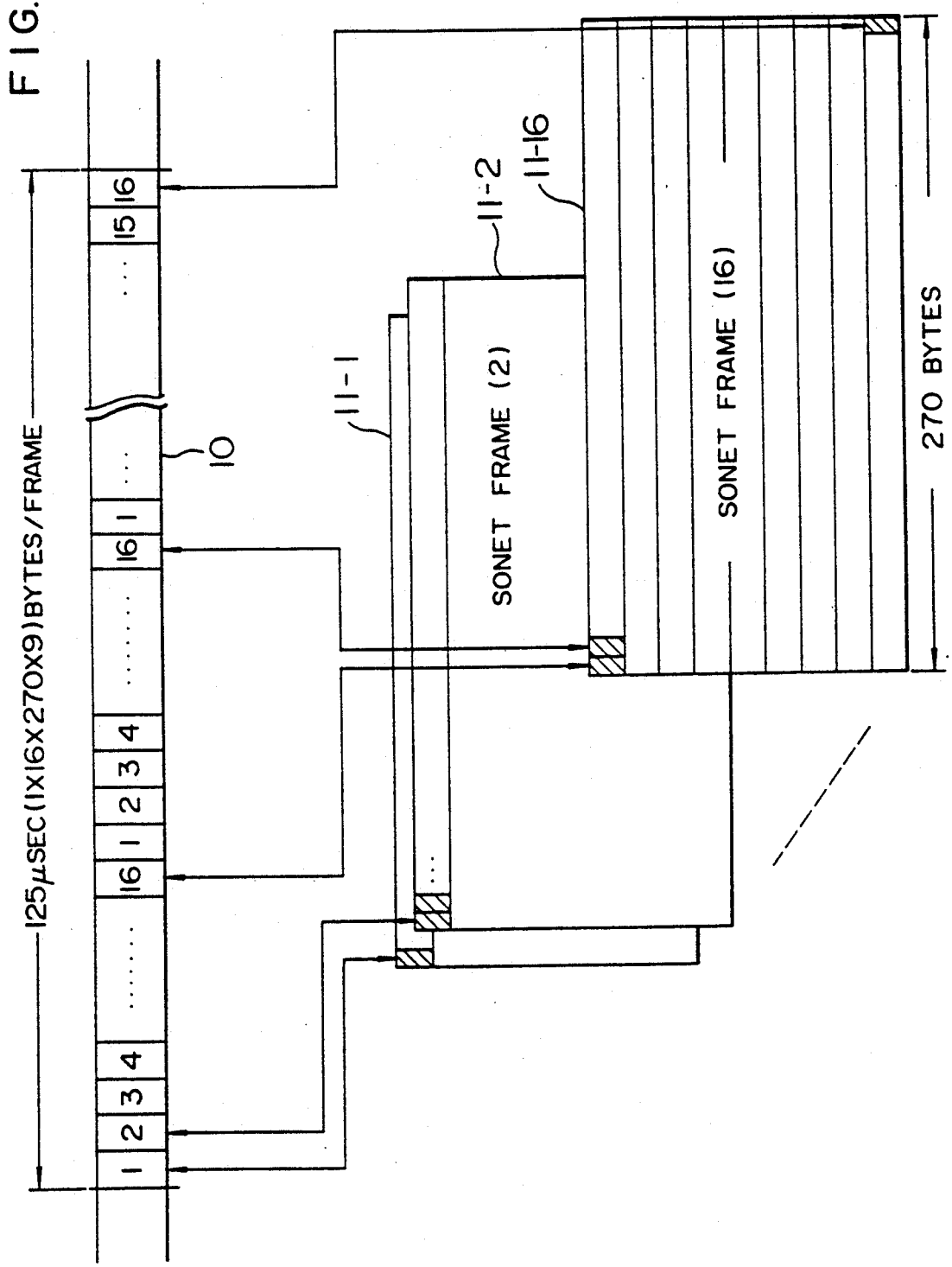

HIGH-SPEED RING LAN SYSTEM

This is a continuation of application Ser. No. 399,901, filed Aug. 29, 1989 now U.S. Pat. No. 5,103,447, and is related to application Ser. No. 672,640 filed Mar. 20, 1991 which is a continuation-in-part of application Ser. No. 399,901 filed Aug. 29, 1989.

BACKGROUND OF THE INVENTION

1. Field of the Invention

The present invention relates to ring LAN (Local Area Network) systems, and more particularly to multi-ring LAN systems suitable for high-speed data transmission and node devices constituting such system.

2. Description of the Related Art

Conventionally, a bus type LAN having a transmission rate, for example, of 150 Mbps, is described in *LEEE COMMUNICATION MAGAZINE*, Vol. 26, No. 4 (1988), pp. 20-28. A ring LAN having a transmission rate of 200 Mbps in which a central supervisiory node in a slotted ring stores received information in a buffer such that a loop round-trip delay is an integer times the length of a frame is described in *GLOBECOM*, 85, 1-4. This reference further describes a method of operating all the respective nodes using a clock extracted from a received signal. A conventional slotted ring accessing system in which a node which acquires a right to access and uses a slot necessarily empties out the slot used after it has made a round trip through the ring is described in *"IEEE, TRANSACTION COMMUNICATIONS"*, COM-29 (1981), p. 1466.

An ATM (Asynchronous Transfer Node) cell using a conventional ring LAN is described in Institute of Electronics, Information and Communication Engineers of Japan, *"KOKAN SYSTEM KENKYUKAI SHIRYO" (SWITCHING SYSTEM RESEARCH SOCIETY MATERIAL)* SSE 88-93.

Conventionally, the transmission rate in a high-speed ring LAN having a transmission rate higher than 100 Mbps is an integer times 100 Mbps as a reference. A public network employs a transmission rate of 155.52 Mbps which is a standard transmission rate according to CCITT (Consultative Committee in International Telegraphy and Telephony), so that if a LAN and a public network are interconnected, a buffer to cause both the transmission rates to match each other is required, thereby causing the connection device to be large-sized.

In the conventional slotted ring, the central supervisory node buffers received information such that the ring round-trip delay of a communication frame is an integer times the length of the synchronous frame in consideration of the accommodation of synchronous information exchanged on a time-divisional basis. Thus, the transmission delay of the signal would increase to thereby reduce the throughput between user devices.

In the conventional access system in which each node which has acquired a right to access necessarily releases a slot used by that node in the next round trip, the transfer efficiency is reduced in the transfer of data longer than an information transfer area in a cell in te ring under low traffic conditions. For example, if (1) the frame period is 125 $\mu$sec, (2) the ring round-trip delay is a time corresponding to one frame, and (3) the cell length is 53 bytes (including 48 bytes of the information transfer area), the transfer rate is 155 Mbps and 44 cells are present on the ring. At this time, assume that the transfer of data of 4,000 bytes occurs at a node. It is necessary to acquire a right to access at least three times before data transfer is completed in the conventional system, and an access waiting time is required which includes at least a time required for three ring round-trips. One of the three round-trips is spent for the round-trip of an empty slot.

Since in the conventional LAN there is only one kind of frame in the transfer path, and a node processes the frames in a serial manner, it is necessary to increase the processing rate of all the nodes in order to increase the transmission rate. Since each node uses a clock extracted from received data when the data is transmitted, there is a limit to the number of nodes which may be connected to a ring due to accumulation of jitters.

SUMMARY OF THE INVENTION

It is an object of the present invention to provide a high-speed ring LAN system suitable for accommodating two or more subnetworks different in signal transmission rate and especially a public network and a LAN.

It is another object of the invention to provide a high-speed ring LAN system which is capable of realizing the transmission of asynchronous information buffered by a user device and handled irrespective of the frame period, and the transmission of synchronous information required to ensure a constant frame period, using a buffer of a relatively small capacity.

It is a further object of the present invention to provide a node device which is capable of transmitting a signal between a high-speed ring LAN and a subnetwork, using a relatively low speed signal processing capability.

In order to achieve these objects, the present invention provides a high-speed ring LAN system for interconnecting a plurality of subnetworks, comprising:

at least one LAN ring-like transmission path; and
a plurality of node devices interconnected by the ring-like transmission path, each node device including:
at least one interface for accommodating the subnetworks;
means for forming n (n is an even number) channels to send therethrough communication frames of a plurality of packet areas of a fixed length to the at least one LAN transmission path at a signal transmission rate of 155.52 Mbps; and
means for exchanging a packet of a fixed length between each of the communication frames and the interface means.

According to the above structure, when each node device accommodates three sub-LANs, for example, of 100 Mbps, it is possible to cause the digital transmission rates of a high-speed ring LAN and the sub-LANs to coincide substantially with each other using two channels, and to substantially eliminate the difference between the transmission rates on the input and output sides of the interface device. If each node device accommodates a public network, it allocates one channel to each public network to cause the input and output rates of the interface to completely coincide.

In accordance with the present invention, a communication frame transmitted to each channel includes a SONET (Synchronous Optical NETwork) subframe which comprises a section overhead (SOH) area of 9 bytes $\times 9$ and a container 4 (VC-4) area of 261 bytes $\times 9$, and the communication frame is transmitted with a fixed-length packet inserted into the VC-4 area.

In accordance with the present invention, if the address of each interface is arranged to correspond beforehand to a particular channel and a packet is sent to a communication frame on a channel selected in correspondence to the destination address of a transmission packet in a transmitting node, the receiving node is required to receive a packet destined for one interface from a particular highway communication frame alone, so that the received packet can be outputted to that interface without congestion.

The foregoing and other objects, advantages, manner of operation and novel features of the present invention will be understood from the following detailed description when read in connection with the accompanying drawings.

BRIEF DESCRIPTION OF THE DRAWINGS

FIG. 2 illustrates a time-divisional multiframe flowing through a transmission path 2;

DESCRIPTION OF THE PREFERRED EMBODIMENTS

Figure 1:
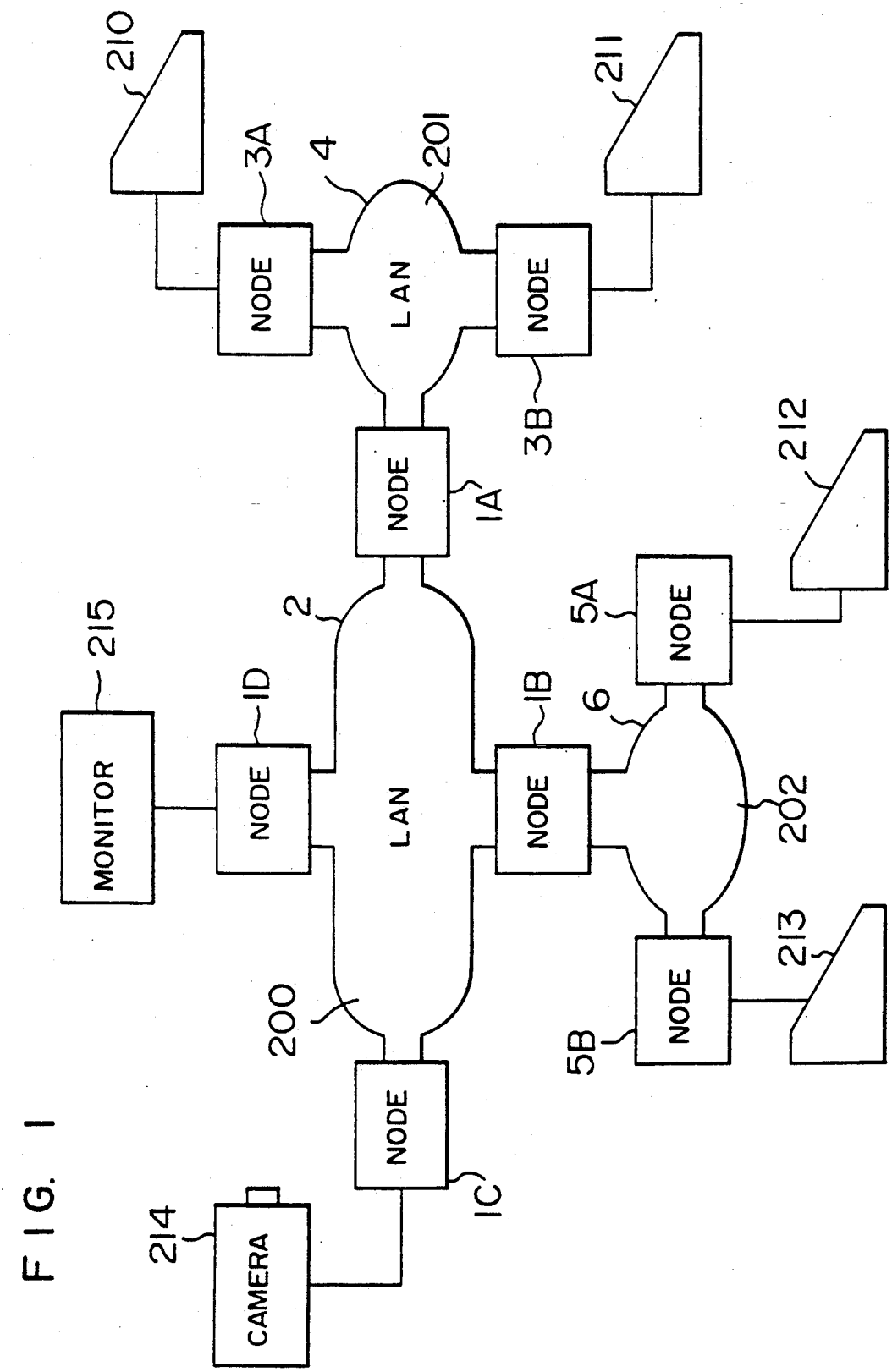
FIG. 1 illustrates the whole structure of a network system according to the present invention.

FIG. 1 illustrates the overall structure of a network system according to the present invention. In FIG. 1, a LAN (Local Area Network) 200 includes nodes 1A-1D and a transmission path 2. A subnetwork 201 including nodes 3A and 3B and a transmission path 4 formed by an optical fiber is connected to the node 1A. A subnetwork 202 including nodes 5A and 5B and a transmission path 6 is connected to the node 1B. The subnetwork 201 is a LAN having a transmission rate, for example, of 100 Mbps according to ANSI (Americal National Standard Institute) and handles packet switching information. The subnetwork 202 is a packet public network having a transmission rate, for example, of 155.52 Mbps which is a standard transmission rate according to CCITT. The nodes 1C and 1D are connected to a camera 214 which handles line switching information and a monitor 215, respectively.

In the embodiment of FIG. 1, the LAN 200 includes only four nodes, but can actually include more (for example, 120) nodes connected thereto and a plurality of sub-LANs and a plurality of public networks can communicate via the LAN 200. Each of the nodes 1A-1D of the LAN 200 has a subnetwork interface (user device interface), and can accommodate a plurality of input/output units or subnetworks. While the nodes 3A, 3B, 5A and 5B of the subnetworks are shown as accommodating corresponding ones the terminal devices 210-213, these nodes may further accommodate low-speed token rings according to IEEE 802 Standards Committee, and other communication systems such as PBXs which handle voice information. In the present invention, the information transmission rate in the transmissio path 2 of the LAN 200 is 155.52 $\times$ n Mbps where n is an even number and close to a common multiple of a public network transmission rate of 155.52 Mbps and the LAN transmission rate of 100 Mbps.

FIG. 2 illustrates the structure of a time-divsion multiplexed transmission frame 10 flowing through the transmission path 2. In this example, the frame 10 includes 16 SONET frames 11-1 to 11-16, each including 270 bytes $\times$ 9 columns produced for 125 $\mu$sec, and multiplexed in units of one byte, and the transmission rate is 155.52 Mbps $\times$ 16. This equals logically a system of 16 transmission paths. According to the present invention, a structure is possible in which each channel includes 16 optical fibers having a transmission rate of 155.52 Mbps.

Figure 3A:
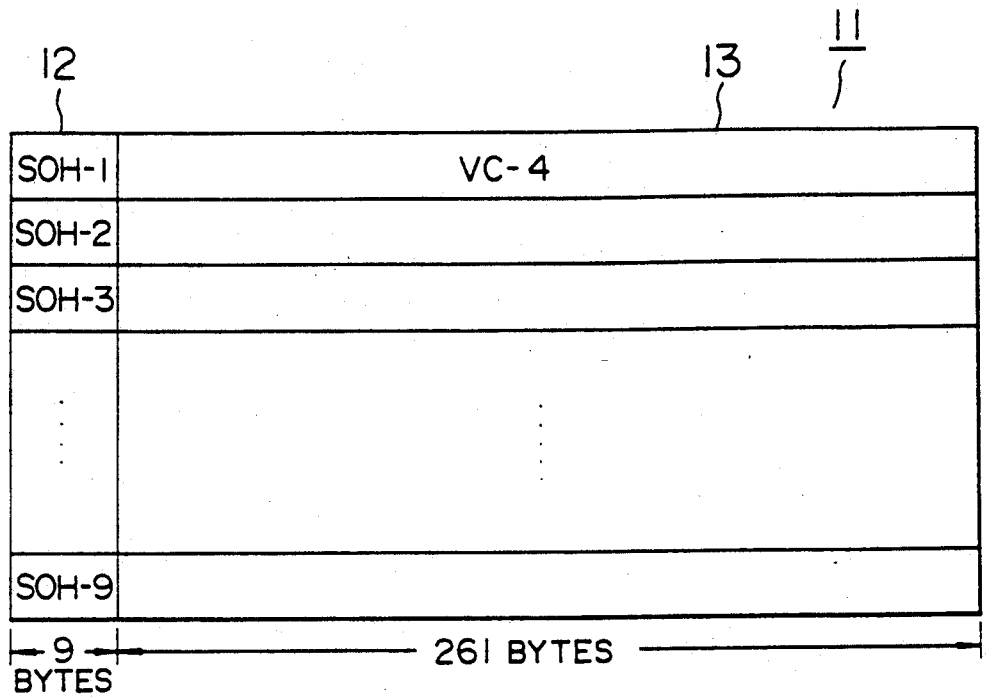
FIGS. 3 and 3B illustrate a SONET frame.
Figure 3B:
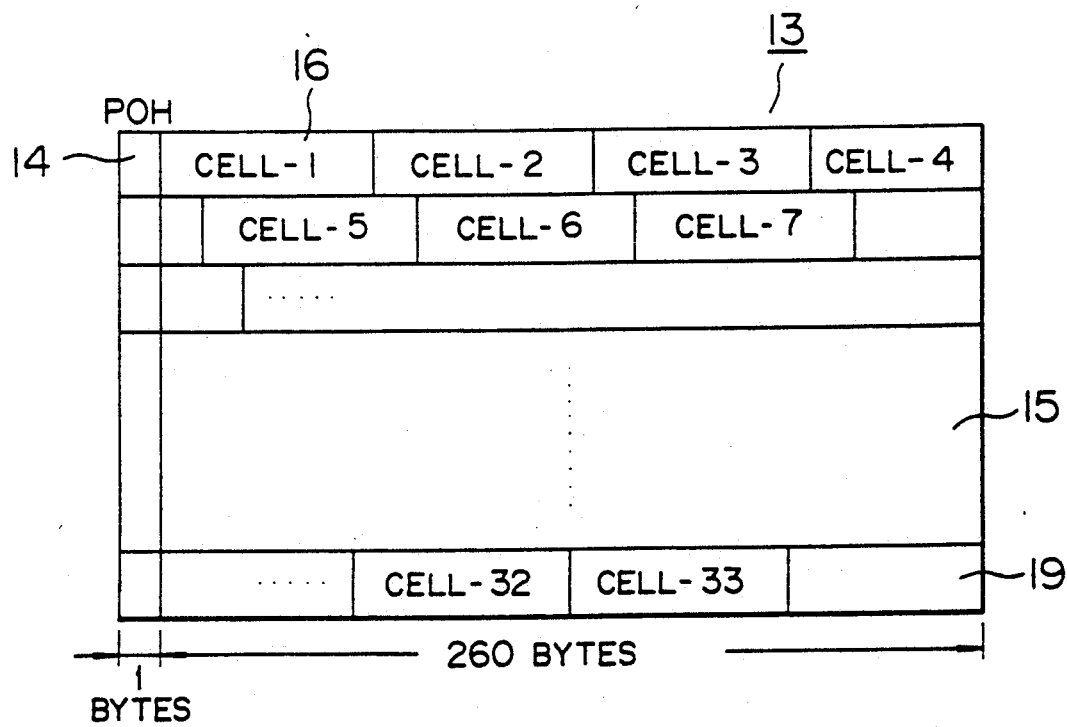

As shown in FIG. 3A, in each SONET frame 11, each column includes a section overhead (SOH) area 12 of 9 bytes and a virtual container 4 (VC-4) area 13 of 261 bytes. Each SOH area 12 includes inter-node communication control information such as a frame synchronizing pattern, identifiers (SONET frame IDs) in units of 155.52 Mbps, and an AU pointer indicative of the position of the head of a container to be described later in more detail. The last three bytes of each SDH area are used as a dummy area for stuffing purposes to be described later in more detail. As shown in FIG. 3B, in the VC-4 area 13, each column includes a pass over head (POH) area 14 of 1 byte for recording control information used in a multiplexing device in a public network, and a cell transfer area 15 of 260 bytes. In one cell 16 having a length of 69 bytes, for example, each SONET frame can accommodate a total of 33 cells in a cell transfer area and the remaining 63 bytes form an invalid area 19. In the present invention, the POH area may be omitted in order to increase the number of cells to be accommodated.

Figure 4:
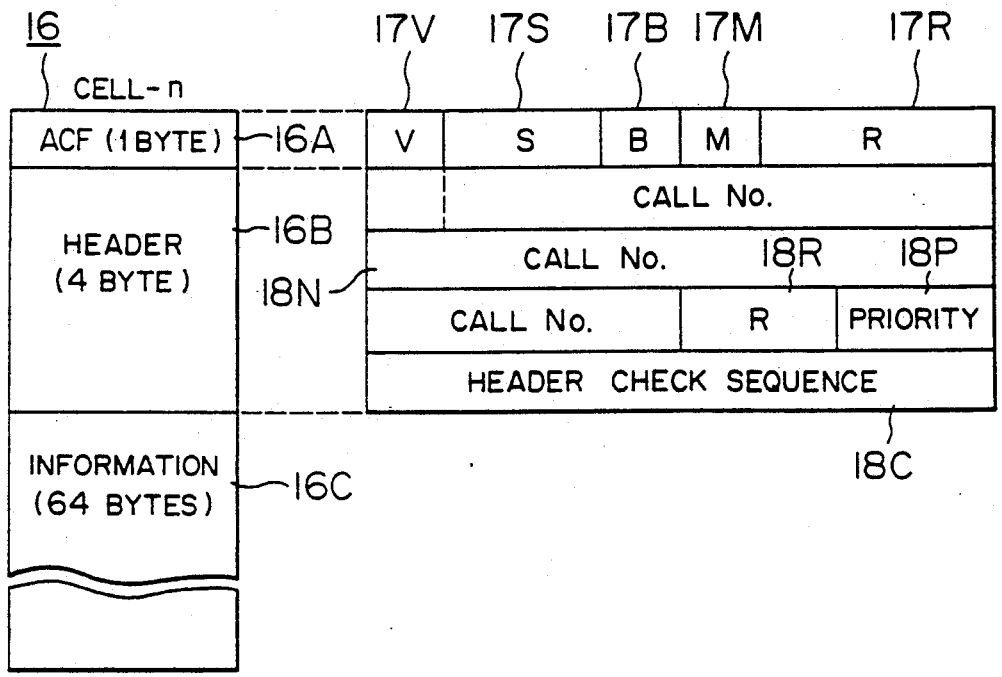
FIG. 4 illustrates the structure of a cell carried away by the SONET frame.

FIG. 4 illustrates the format of a cell 16 which includes an access area (ACF) 16A of one byte, a header area 16B of 4-bytes and an information area 16C of 64 bytes. The ACF area 16A includes a validity indicating bit 17V indicative of whether the contents of the appropriate cell are valid or not, a classification bit 17S indicative of which of packet switching information, line switching information and inter-node control information the contents of the information area 16C indicate, a multi-destination information indicating bit 17B indicative of whether the appropriate cell is a multi-destination information cell, a monitor bit 17M for monitoring a limitless round-trip of a cell due to bit error/node malfunction, and a reserve bit 17R. The header area 16B includes a call number 18N of 20 bits in total, a 2-bit priority level indicator 18P indicative of the priority level of cell switching, a reserve bit 18R and an error check sequence 18C of 8 bits for detection of errors in the ACF area 16A and header area 16B. An output terminal of each node connected to a subnetwork interface is assigned a unique 9-bit output terminal address in the network system when constructed. The call number 18N includes a combination of the output terminal addresses of a destination node and a transmission source node. When each node sends a cell, it sets a valid bit in the validity indicating bit 17V, and when it erases the cell, it nullifies the validity indicating bit and clears the call number 18N to zero.

Figure 5:
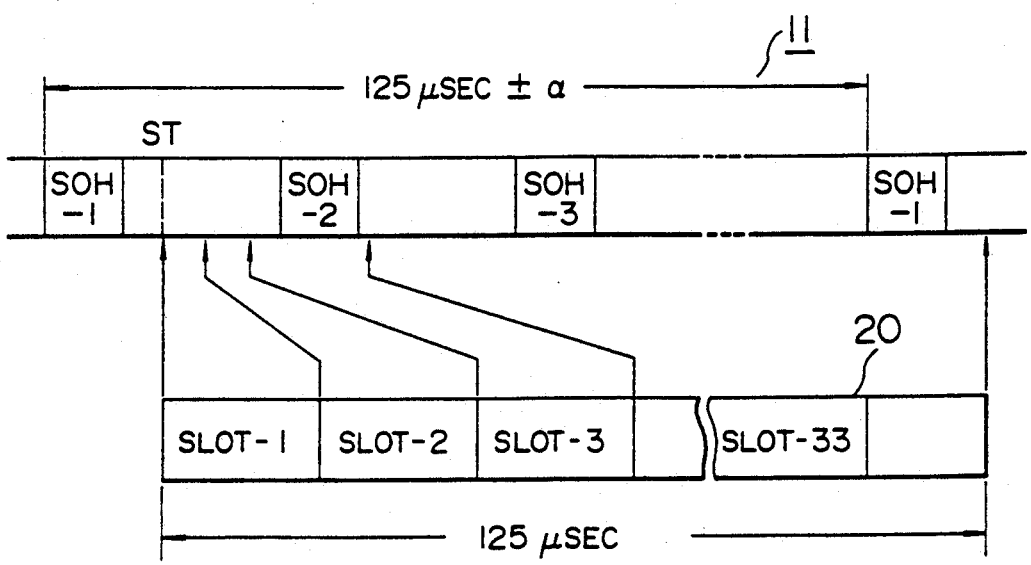
FIG. 5 illustrates the relationship between SONET frame and a container.

FIG. 5 illustrates the relationship between one SONET frame 11 constituting a part of the time-division multiplexed frame 10 circulating through the transmission path 2 and a container sent out on the SONET frame. Each of the nodes included in the LAN 200 produces 16 SONET frames 11-1 to 11-16 on the basis of a respective basic clock outputted from a clock generator of each node and sends a frame 10 of time-division multiplexed frames through the transmission path 2 to an adjacent node. Therefore, each received SONET frame 11 reflects errors involved in the basic clock from the transmission source (upstream) node and the frame period is 125 μsec ±α. In the LAN 200, one reference node in the ring uses a container 20 produced at a period of 125 μsec to realize a communication of a 125-μsec period among all the nodes connected by the transmission path 2. The container 20 is the same in overall length as the cell area (260 ×9 bytes), of the SONET frame, and includes 33 slot areas of a length of 69 bytes as the same size as the cell 16 and an invalid area of the remaining size. The contents of the respective slots in the container 20 are sequentially written into the cell area of the SONET frame 11 and the resulting frame is then sent to an adjacent node. The node which has received the SONET frame produces a container synchronously with the reception rate of data in the received container, and entrains it on the SONET frame produced by that node itself, as will be described in detail later with reference to FIG. 13. The difference between the frame and container period is absorbed by moving (stuffing) the starting position ST of the container in the SONET frame, and the starting position ST is stored in the SOH area 12 as an AU pointer.

Figure 6:
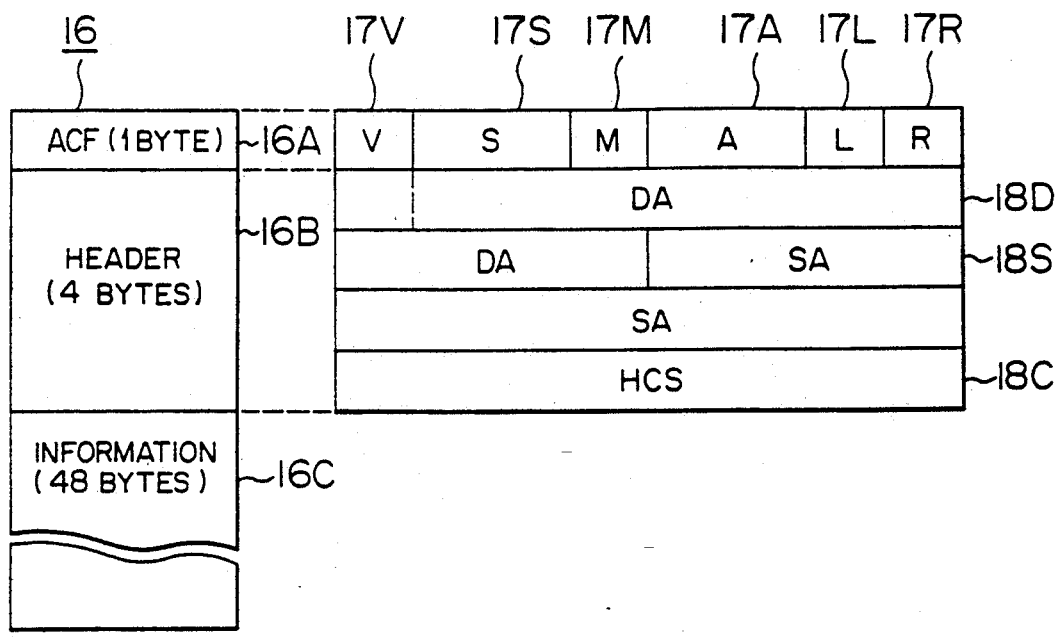
FIG. 6 illustrates the structure of another cell.

FIG. 6 illustrates another example of the format of cell 16. This cell has an information area 16C of 48 bytes and has the overall length shorter than that of FIG. 4. The ACF area 16A includes a validity indicating bit 17V, an information classification indicating bit 17S, a monitor bit 17M, an access level indicating bit 17A indicative of the priority level of information at which the appropriate cell area (slot area) can be used, a release indicating bit 17L indicating that any node requires the release of that slot, and a reserve bit 17R. The header area 16B includes a destination address 18D of 12 bits, a transmission source address 18S of 12 bits, and a header check sequence 18C, indicating whether the header bit of the destination address is multi-destination information.

Figure 7:
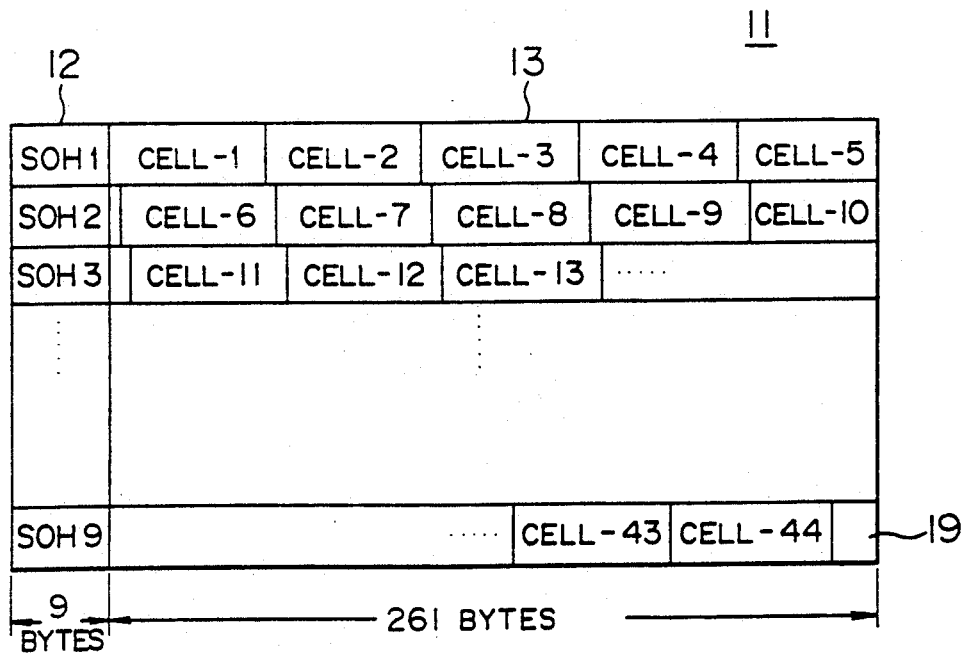
FIG. 7 illustrates another arrangement of cells of a SONET frame.

FIG. 7 illustrates the use of the whole VC-4 area 13 of 261 ×9 bytes for transmission of cell information by deleting the POH area to set many cell information segments in the SONET frame 11 with the head of the container being shown as being directly after SOH1. Forty-four cells of a length of 53 bytes can be inserted into the VC-4 area by deleting the POH area to thereby reduce the invalid area 19 to a 17-byte area.

Figure 8:
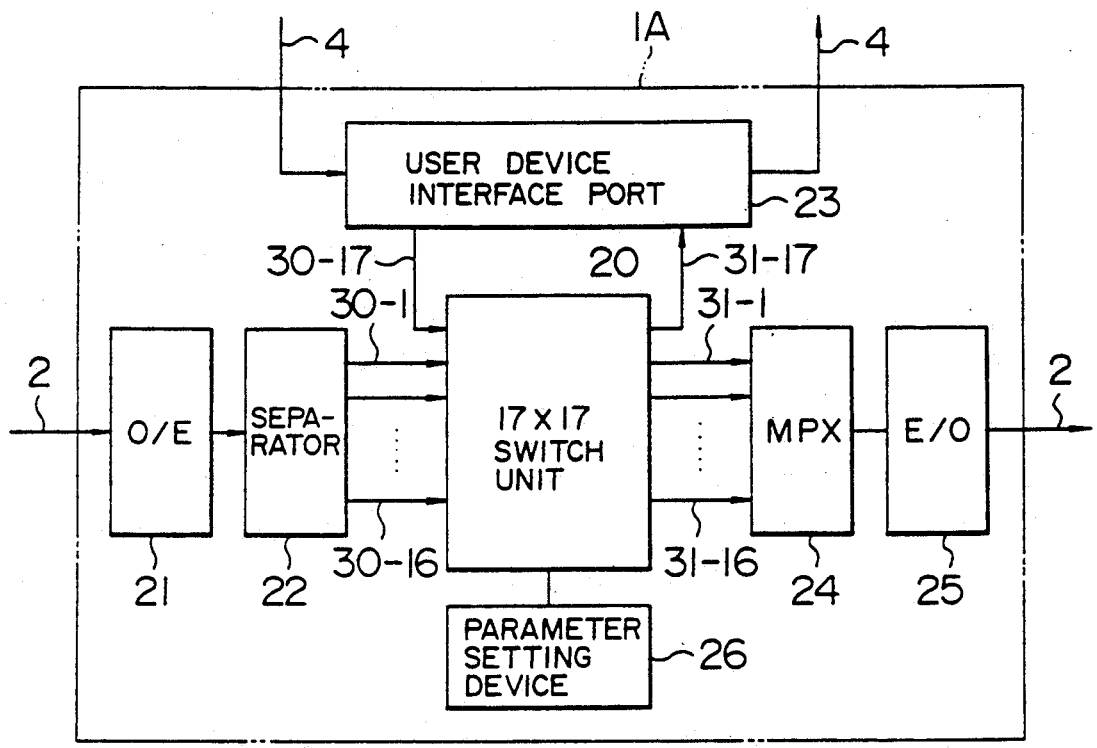
FIG. 8 is a basic schematic of nodes constituting the LAN.

FIG. 8 illustrates the basic structure of the node 1A. Other nodes 1B-1D have the same structure as the node 1A. The node 1A includes a switch unit 20 which has 17 inputs (signal lines 30-1 to 30-17) and 17 outputs (signal lines 31-1 to 31-17) for switching slot information therebetween, a photoelectric (0/E) converter 21 which converts an input optical signal from the optical fiber transmission path 2 to an electrical signal, a separator 22 which separates a 155.52 ×16 Mbps received signal outputted from the converter 21 into 16 highways (channels) and which sends to the switch unit 20 via the signal lines 30-1 to 30-16 the contents of the cell area of the SONET frame reproduced in each channel, a user device interface 23 connected between the signal lines 30-17 and 31-17, a multiplexing unit 24 which assembles the slot information outputted from the switch 20 into a SONET frame for each channel and which multiplexes these in units of a byte in a time division manner, an electro-optical converter 25 which converts an electrical signal outputted from the multiplexing unit 24 to an optical signal and outputs it to the optical fiber transmission path 2, and a parameter setting device 26. If 16 optical fibers are used for each channel, the separator 22 and multiplexing unit 24 are not required, but a photoelectric converter 21 and electro-optical converter 25 are required for each channel instead.

Figure 9:
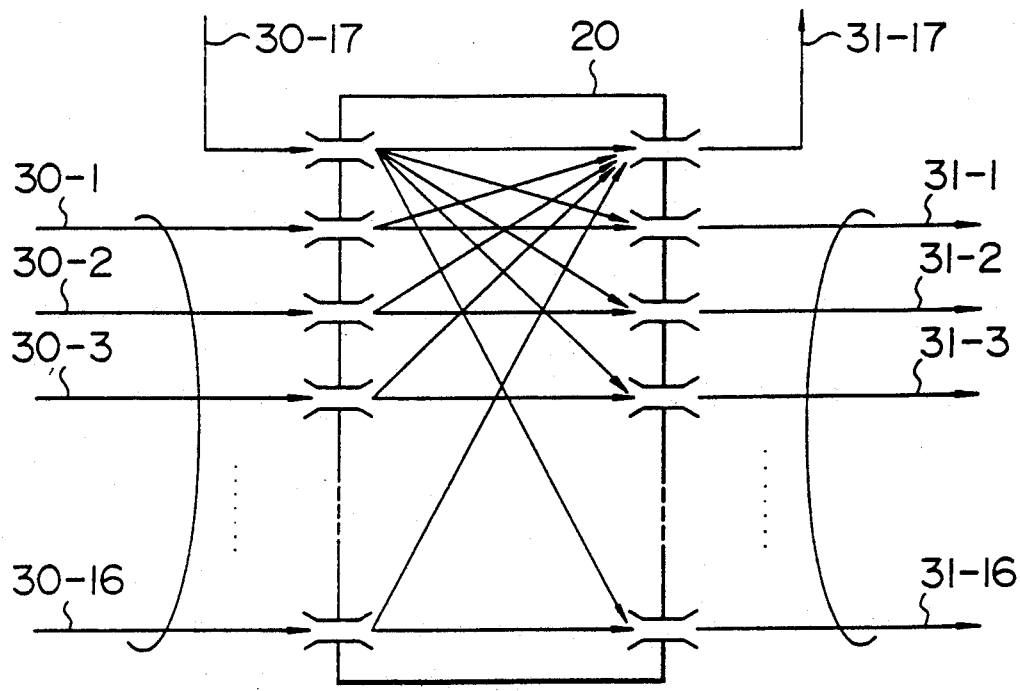
FIG. 9 illustrates the functions of a first embodiment of a switch unit 20.

FIG. 9 illustrates the function of the switch 20. In this example, the switch unit 20 includes 17 input channels and 17 output channels, one pair of input and output channels (signal lines 30-17 and 31-17) being connected to the user device interface 23, other input and output channels (signal lines 30-1 to 30-16, 31-1 to 31-16) corresponding to the respective channels of the time divisional multiplexing frame 10. The cell information received from the input signal line 30-k (k=1-16) is switched (outputted) to the output signal line 31-17 if the cell information is destined for the node concerned, and switched (outputted) to the output signal line 31-k otherwise. If a system is employed in which each cell information is erased by its source node, each node duplicates cell information destined for that node and outputs the received cell (or duplicated cell) to the output line 31-k and the duplicated cell (or received cell) to the output line 31-17. In order to avoid the concentration of cell information on the single output signal line 31-17 from a plurality of input channels in each switch, a channel to be used may be allocated to each node. For example, it may be arranged that when information is sent from the node 1A to the nodes 1C and 1D, the first channel 31-1 is used, and if information is sent from the node 1A to the node 1B, the second channel 31-2 is used. Similarly, if information is sent from the node 1B to the nodes 1C and 1D, the first channel may be arranged to be used also. The cell information for the nodes 1C and 1D is received in principle from only the input signal line 30-1 in the nodes 1C and 1D thereby avoiding possible congestion of cells toward the output signal lines 31-17.

The transmitted cell information received by the switch via the input signal line 30-17 from the user device interface 23 is sent to the output signal line 31-17 if the cell information is destined for the node which includes that switch, and sent to an output signal line or a channel 31-1 corresponding to a different destination node if the cell information is destined for the different node, except when the cell information is multi-destination information. If the cell information is the multi-destination information, a plurality of cells are duplicated and outputted to all the channels. The user frame inputted into the user device interface 23 via the transmission path 4 from the sub-LAN is about 4K bytes long at a maximum, so that one user frame is divided into information areas 16C of a length (of 64 bytes) in FIG. 4, which are then sent as cell information segments.

Figure 10:
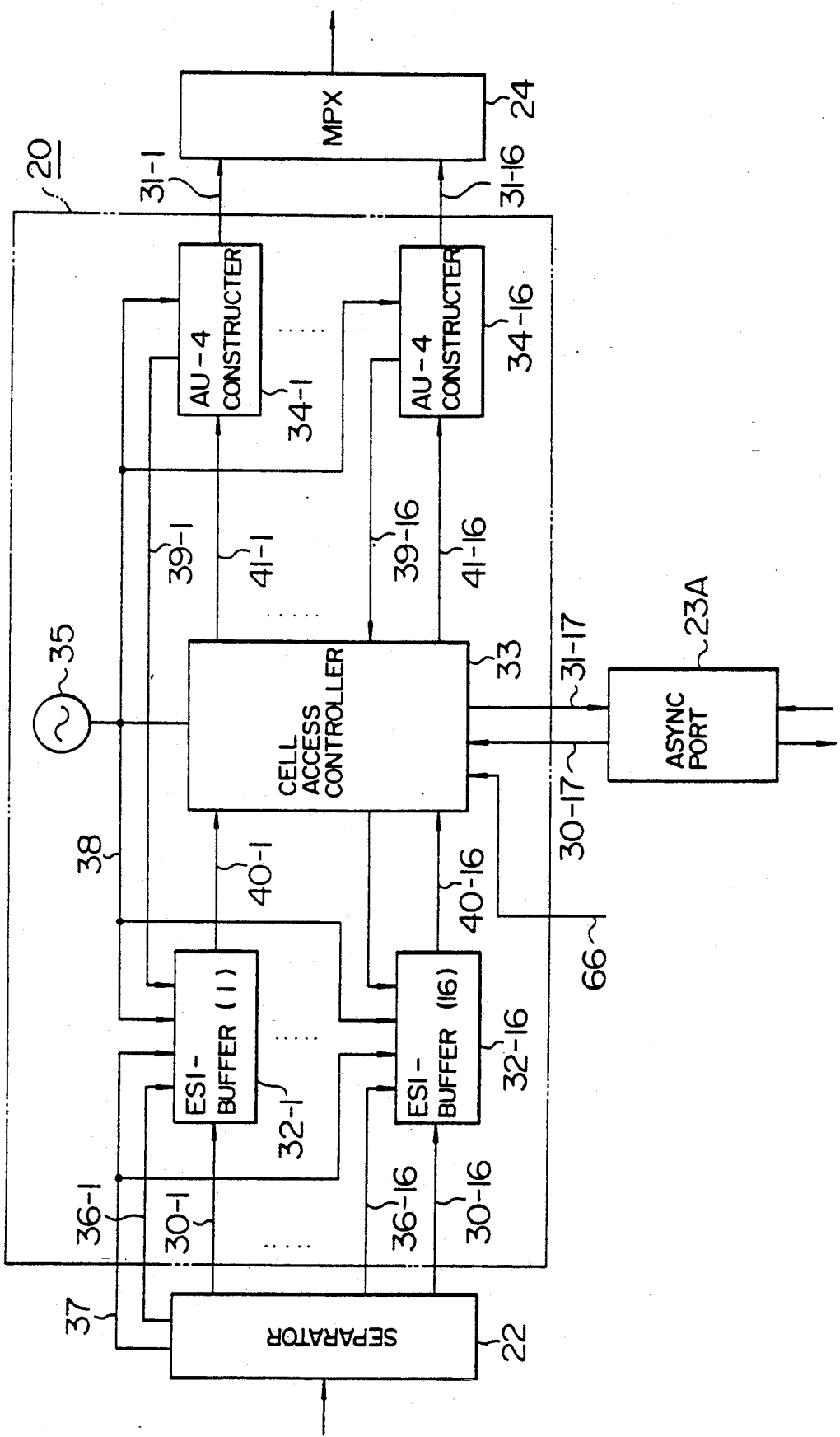
FIG. 10 illustrates a specific structure of the switch unit 20.

FIG. 10 illustrates one embodiment of a switch unit 20 in which the user device interface includes an asynchronous port 23A which handles time awaiting information. The separator 22 extracts a frame synchronization signal from the received time-division multiplex frame 10 and separates the received frame into 16 SONET frames in accordance with the synchronization signal. It also reads the SOH section 12 of each SONET frame and outputs the information in the VC-4 area 11 to the signal lines 30-1 to 30-16 synchronously with a basic clock 37 produced from the received frame. If the validity indicating bit of the cell concerned is "1" when each cell information is being outputted, write enable signals 36-1 to 36-16 become "1".

The switch unit 20 includes 16 elastic buffer memories 32-1 to 32-16 corresponding to the signal lines 30-1 to 30-16. Each elastic buffer extracts data received from the signal lines 30-1 to 30-16 synchronously with the basic clock 37 during the time when the write enables signals 36-1 to 36-16 are "1". Each elastic buffer has a data storage capacity of several to tens of bytes and discards the input data if the data therein overflows. The switch unit 20 includes a cell access controller 33 which receives cell information from the elastic buffers 32-1 to 32-16 via signal lines 40-1 to 40-16, receives cell (slot) information from the asynchronous port 23A and branches the cell information to the asynchronous port 23A, and AU-4 constructers 34-1 to 34-16 provided in correspondence to the output signal lines 31-1 to 31-16.

The reading of data from the respective elastic buffers 32-1 to 32-16 is effected synchronously with the basic clock (of 155.52 MHz±320 ppm) 38 generated from a pulse generator 35 during the time when the read enable signals 39-1 to 39-16 outputted by the AU-4 constructers 34-1 to 34-16 are "1". Each AU-4 constructer is used to generate a SONET subframe comprising a SOH area 12 and a VC-4 area 13 and changes the read enable signal to "1" for a time zone corresponding to a predetermined number of cell areas 15 except for the overhead areas (SOH and POH) and an invalid area 19.

The cell access controller 33 checks the ACF area 16A and header area 16B of the cell information read out from the respective elastic buffers 32-1 to 32-16, sends the cell information destined for the node concerned to the asynchronous port 23A, and erases the cell information generated from that node. It also inserts the transmission cell information received via the signal line 30-17 from the asynchronous port 23A into an empty cell area in the channel corresponding to the destination node. The cell information received from the signal lines 40-1 to 40-16 except for the cell information generated by the node concerned and to be erased are delivered to the AU-4 constructer via the output signal lines 41-1 to 41-16 corresponding to the signal lines 40-1 to 40-16. If there are no valid cell information in the elastic buffer 32, the information on an empty cell is outputted to the signal line 41.

The respective AU-4 constructers 34-1 to 34-16 insert the cell information received from the signal lines 41-1 to 41-16 into the cell area 15 of the SONET frame concerned and outputs the same to the multiplexer 24. If the respective user device interfaces of the nodes 1A-1D include only an asynchronous port, stuffing using an AU pointer is unnecessary so that the AU-4 constructers 34-1 to 34-16 are required to insert cell information corresponding to the respective head slots of the containers at all times into the corresponding head cell areas of the SONET frames.

Figure 11:
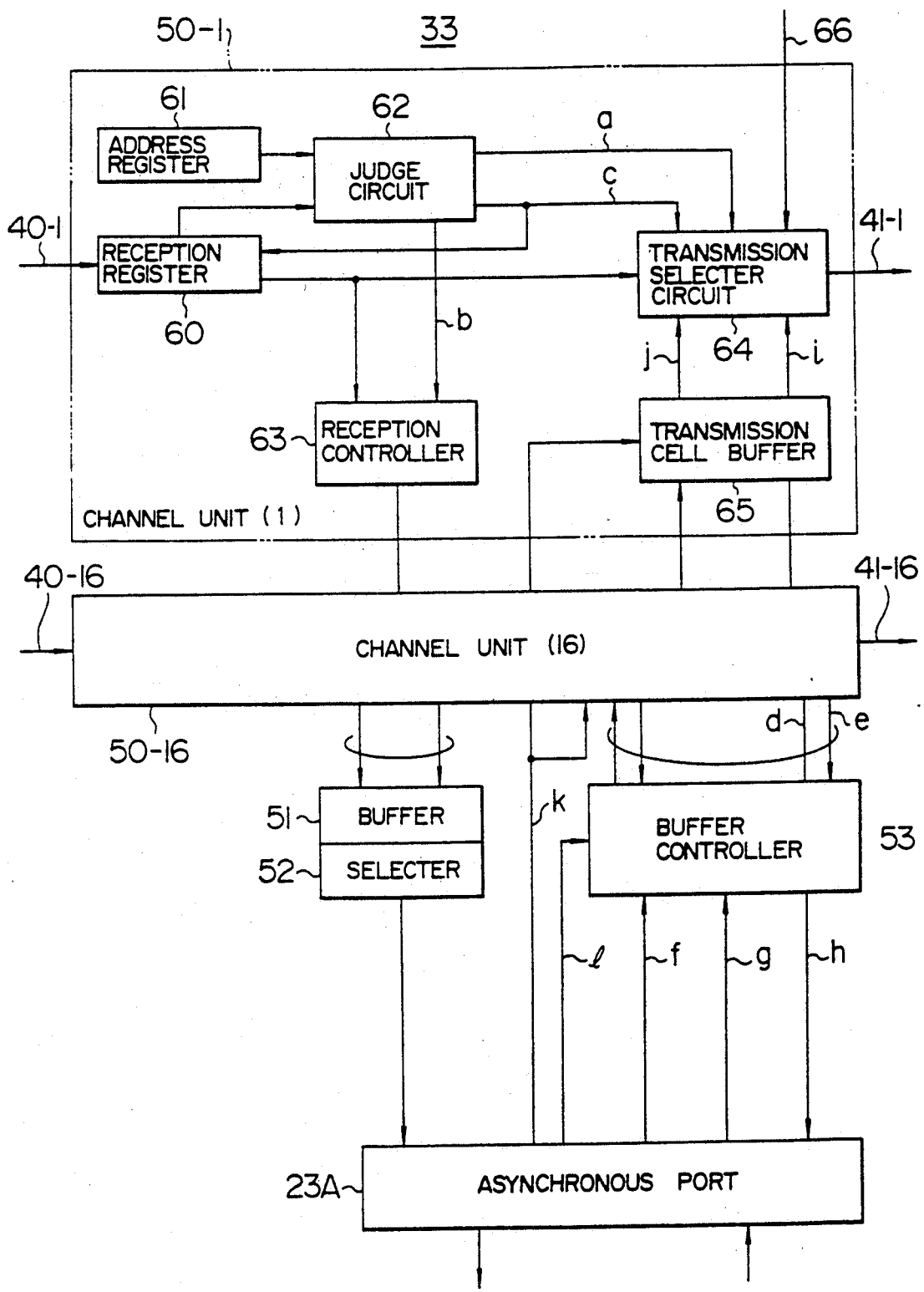
FIG. 11 particularly illustrates a cell access controller 33 of FIG. 10.

FIG. 11 illustrates the details of the cell access controller which includes channel units 50-1 to 50-16 corresponding to the channels. The channel unit 50-1 includes a reception register 60 which temporarily stores cell information received via the signal line 40-1 from the elastic buffer 32-1, an address register 61 which stores the address allocated to the asynchronous port 54 and a judge circuit 62. The judge circuit 62 generates (1) a signal a indicative of permission for transfer of cell information caused by the reception of an empty cell, (2) a reception indicating signal b indicative of the reception of a cell destined for a port for connection of the node concerned, and (3) a cell erasure (slot release) designating signal c caused by the reception of a cell generated from the port for connection of the node concerned in accordance with the ACF section and header section received by the reception register 60 and the contents of the address register 61.

The signal b is delivered to a reception controller 63 which stores in the buffer memory 51 the cell information outputted from the reception register 60 when the signal b indicates the reception of the cell destined for the port 54.

Signals a and b are delivered to the transmission selector circuit 64 which selects cell information (slot information) j outputted from a transmission cell buffer 65 in the following cases, and otherwise, selects the output from the reception register 60 and outputs it to the output line 41-1:

(1) When the cell information transmission request signal i from the transmission cell buffer 65 is "1" and the signal a is changed to a cell information transfer enable state;

(2) When the signal c indicates the erasure of the cell and the release indicating bit 17 is 0, namely, the node which requires the release of a right to access is not on the ring if a conditional continuous use enable mode is set by a signal 66 from the parameter setting device 26; and (3) When the transmission selector is set in a continuous use enable mode by the signal 66.

The transmission cell buffer 65 is connected to a buffer controller 53 via signal lines d and e and to the asynchronous port 23A via a data line k. If the asynchronous port 23A has cell information to be transmitted, it sends to the controller 53 a write request signal g, an output channel designating signal 1 and a signal f indicative of whether the cell information is for multi-destination. The output channel can be designated by referring to an address table which beforehand defines the relationship in correspondence between destination addresses and numbers of the channels to which the destination ports are connected. The buffer controller 53 delivers a write ready signal h to the port 23A if the transmission cell buffer 65 in the designated channel has outputted a write ready signal e and supplies a write enable signal d to the designated buffer. The port 23A confirms the ready signal h and outputs cell information 16 to be transmitted to the data line k.

The transmission cell buffer 65 may be composed of a first-in first-out buffer which is divided into a first memory area which is capable of storing any of a cell having a particular destination and the multidestination cell, and a second memory cell which is capable of storing the multi-destination cell only. If the second memory area for the multi-destination cell only is prepared, the multi-destination cell can be written into the transmission buffer even if the first memory area is full, so that the stagnation of subsequent cells due to the inability to send the multi-destination information is prevented.

The received cell destined for the asynchronous port 23A is stored in the buffer 51 and then inputted into the port 23A via the selector 52.

Figure 12:
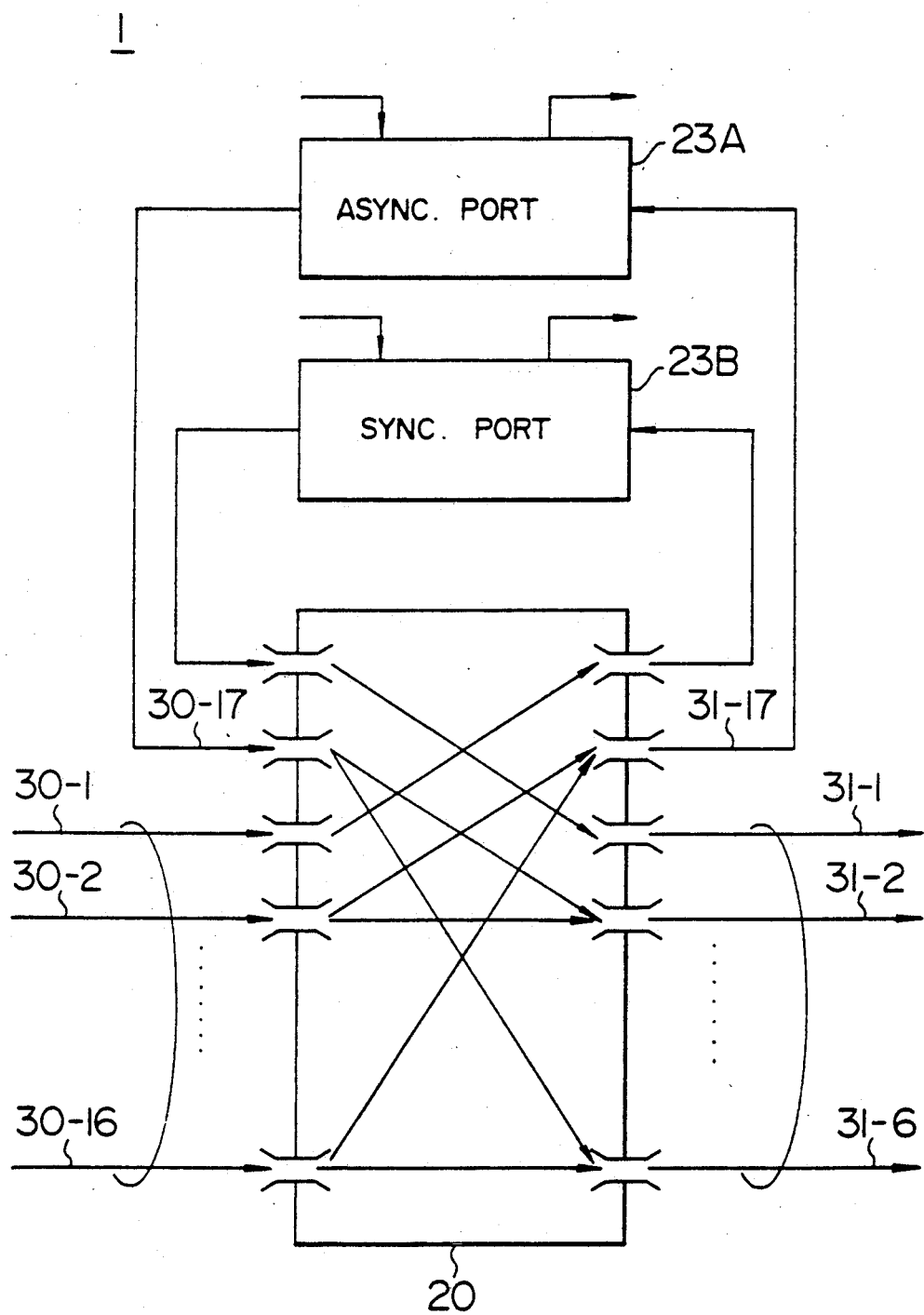
FIG. 12 illustrates the function of a second embodiment of the switch unit 20.

FIG. 12 illustrates a second embodiment of the node 1. In the particular embodiment, asynchronous port 23A and synchronous port 23B are provided as user device interfaces in the node 1, and a special-purpose channel (a first channel including signal lines 30-1 and 31-1 in the particular embodiment) is allocated to the synchronous port. The synchronous port 23B handles line switching information which specifies a transmission/reception port depending on a position on a container and transfers inforation synchronously with a 125-μsec period.

Figure 13:
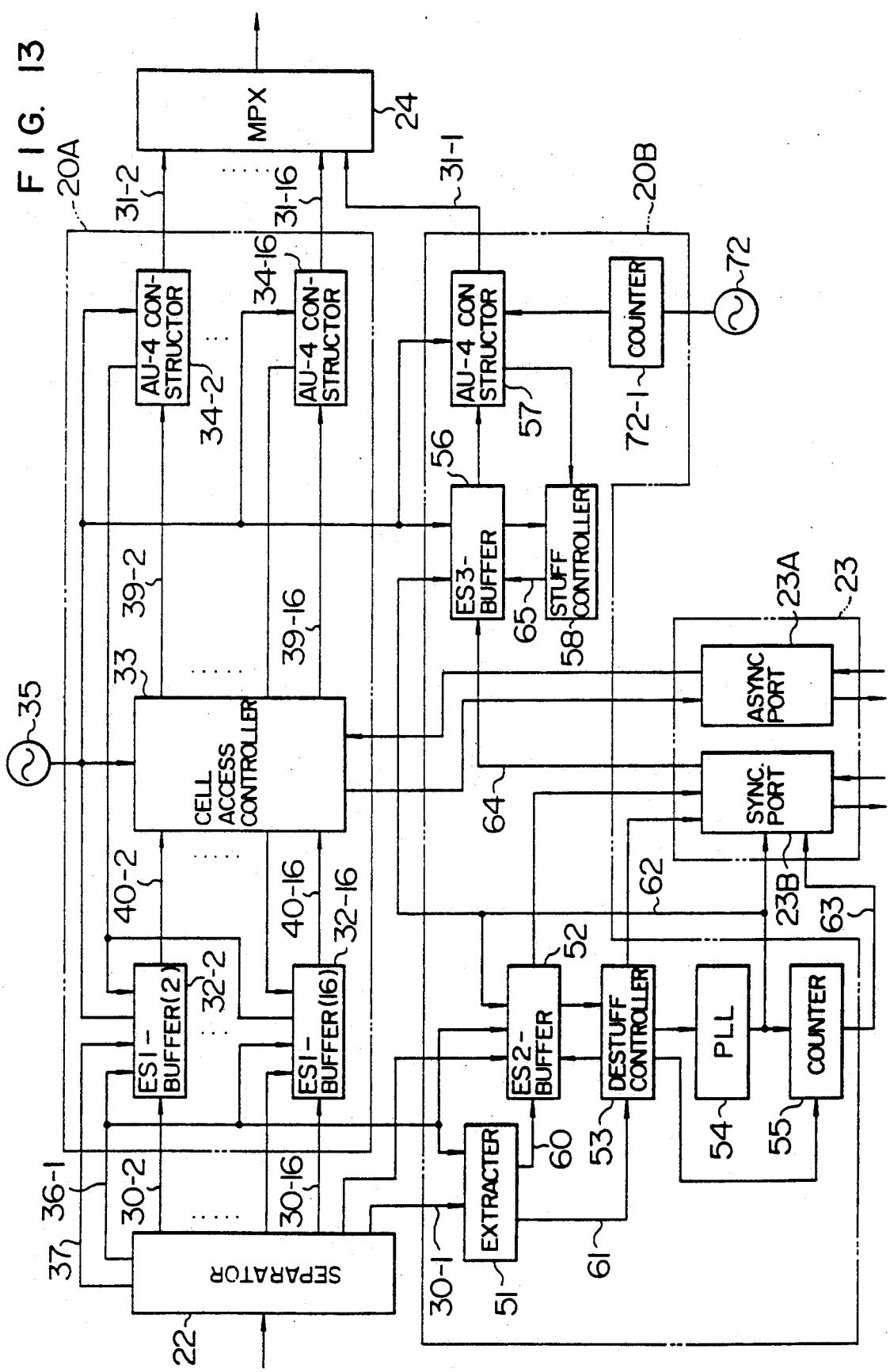
FIG. 13 illustrates a specific structure of the switch unit of the second embodiment.

FIG. 13 illustrates one embodiment of the switch unit 20 corresponding to FIG. 12. In FIG. 13, an asynchronous-cell processor 20A exchanges cells in the second to sixteenth channels and has a structure similar to that of FIG. 8. A synchronous information processor 20B exchanges information synchronously with the reception rate of data from the first channel between the seventh channel and synchronous port 23B.

The synchronous information processor 20B includes a control information extractor 51 which receives a SONET frame signal 30-1 in the first channel received from the separator 22, an elastic buffer memory 52 which stores cell information received via the extractor 51 and a signal line 60, and a de-stuff controller 53 which receives an AU pointer received via a signal line 61 from extracter 51, and a signal indicative of the starting position of the VC-4 area 11 to control, the reading of data from the elastic buffer 52. The de-stuff controller 53 delivers as a pull-in signal to a PLL 54 a clock of 8 KHz synchronous with the starting position of the VC-4 area. The PLL 54 generates a clock CL1 of 149.76 MHz to a signal line 62 in accordance with the clock signal. The clock CL1 corresponds to a time per bit to read data (of 260 ×9 ×8 bits) in the cell transfer area 15 of FIG. 3B at frame periods of 125 μsec. The cell information received by the elastic buffer 52 is read bit by bit by the synchronous port 23B in accordance with the clock CL1.

The synchronous port 23B inserts and branches information at the position, allocated to that port 23B, on the container in accordance with clock CL1, a frame synchronizing signal of 8 KHz from a signal line 63 obtained by division by a counter 55, and a signal indicative of the head byte of the frame delivered by the de-stuff controller 53. The cell information and the head information of the container outputted on a signal line 64 from the synchronous port are written into an elastic buffer memory 56, read by a stuff controller 58 and inputted to an AU-4 controller 57. The AU-4 controller 57 sends the form of the received container at continuous timing.

The AU-4 controller 57 of the central supervisory node generates and sends a container using a periodic signal of 8 KHz produced by the counter 72-1 from an external pull-in clock 72 with which the synchronous port 23B is synchronized. The stuff controller 58 receives from the AU-4 constructor 57, a signal indicative of the starting position of a dummy area (stuffing area) in each of the POH areas in the SONET frame, and delivers a cell information read enable signal 65 at the timing corresponding to a quantity of data stored in the elastic buffer 56. If the quantity of data stored in the buffer 56 is large, the stuff controller 58 starts to write cell information in the stuffing area to increase the number of data segments outputted by the buffer 56 to thereby adjust the data transfer rate such that the quantity of data in the buffer becomes constant on the average.

Figure 14:
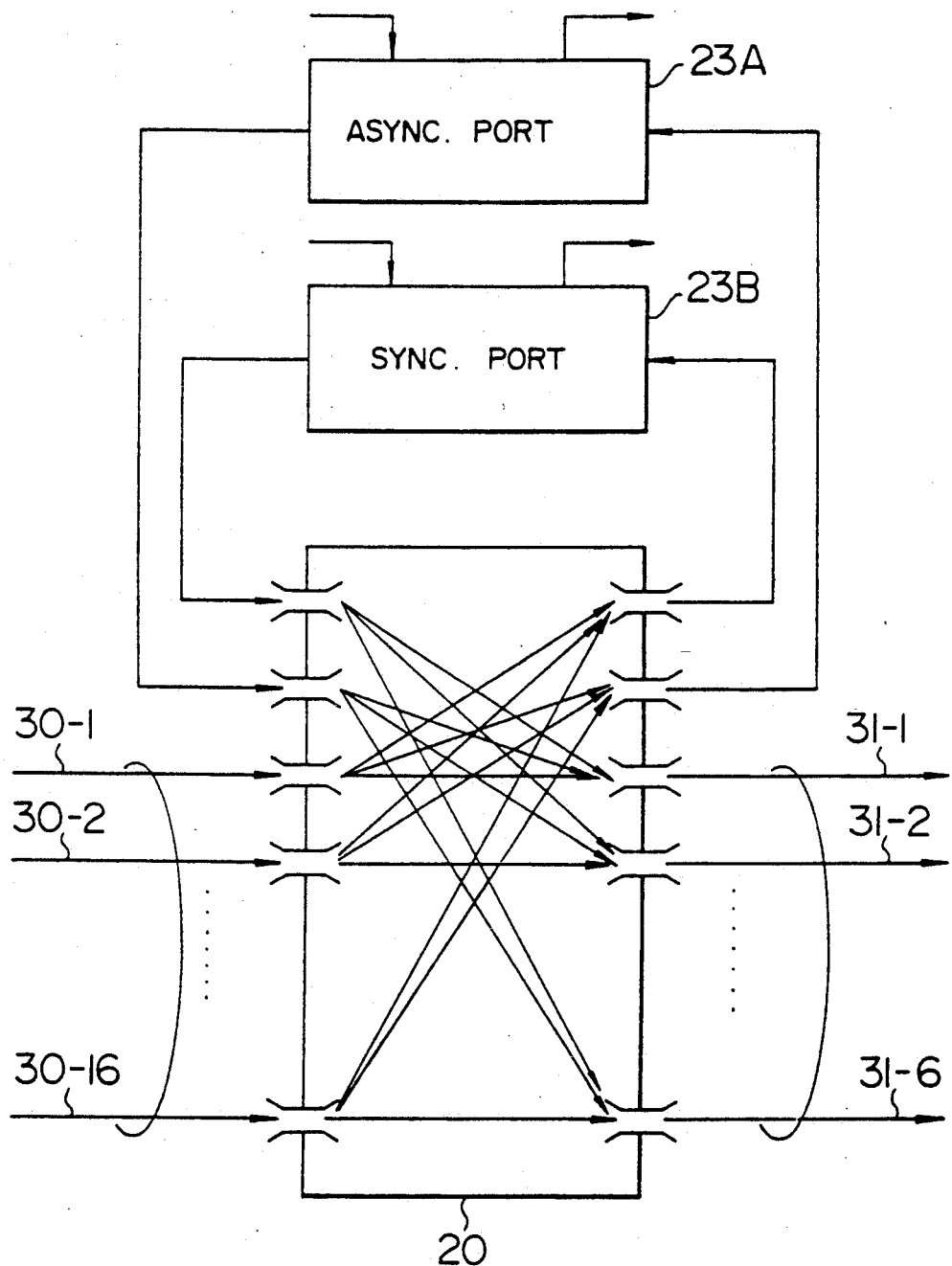
FIG. 14 illustrates the function of a third embodiment of the switch unit 20.

FIG. 14 illustrates a third embodiment of the node 1 in which the switch unit 20 branches the cell information from any one of the input channels 30-1 to 30-16 to the asynchronous port 23A and synchronous port 23B such that the cell information can be transferred to any of the output channels 31-1 to 31-16 from both the ports.

Figure 15:
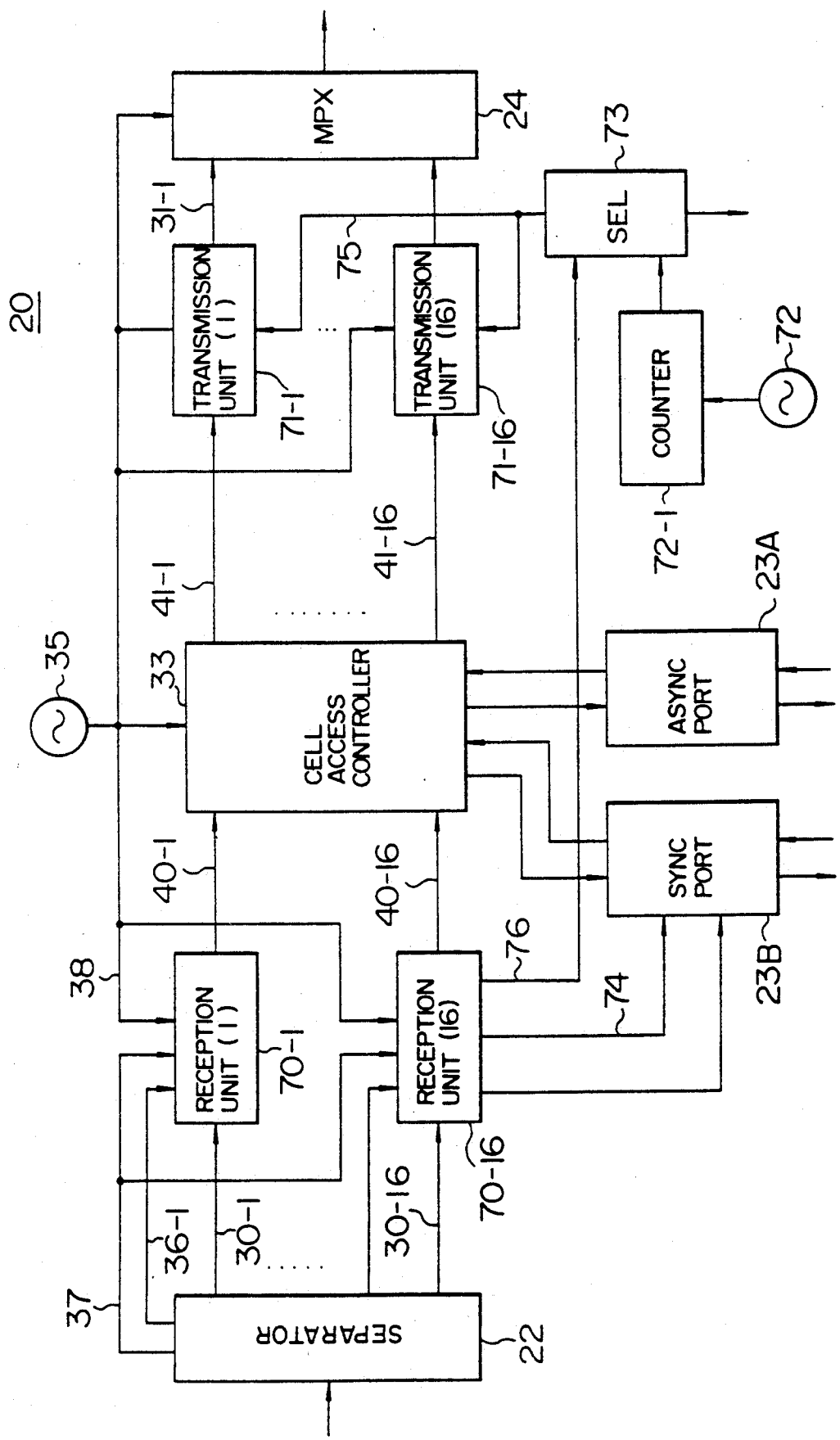
FIG. 15 illustrates a specific structure of a switch unit of the third embodiment.
Figure 16:
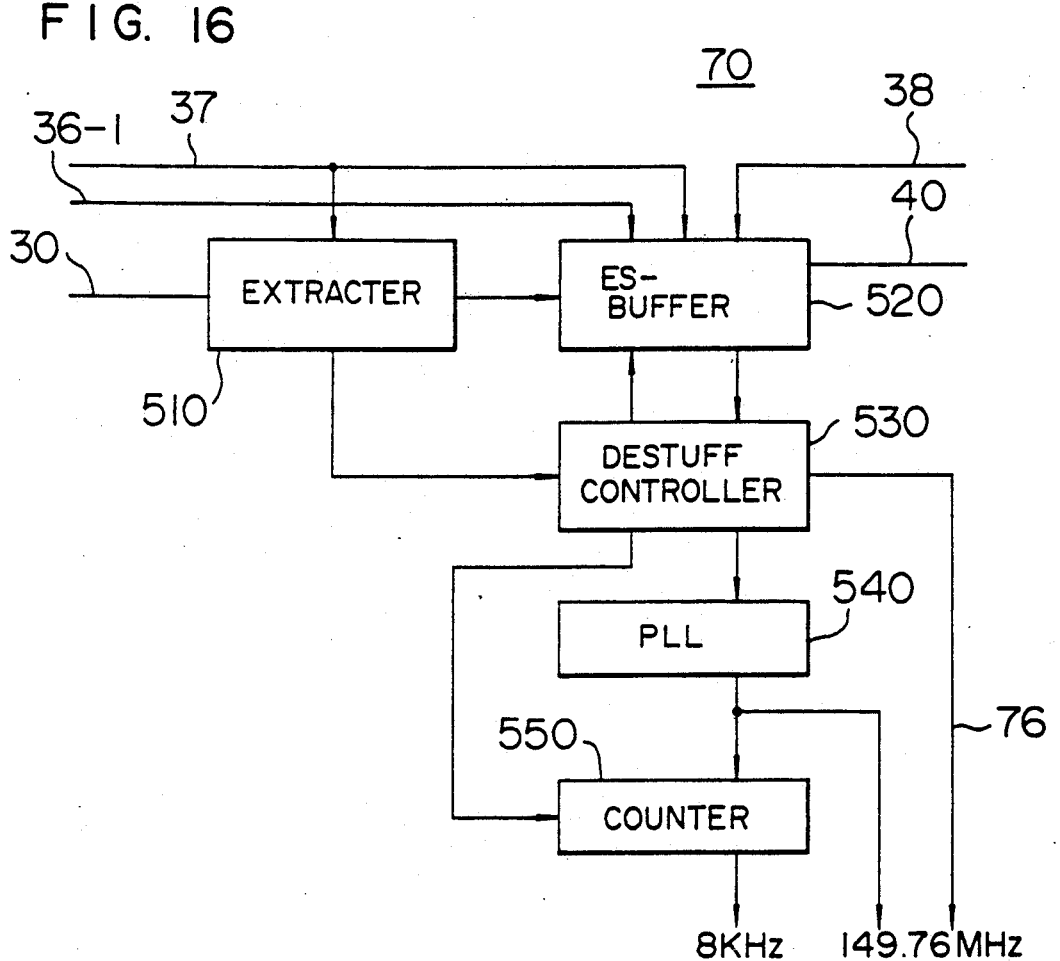
FIG. 16 particularly illustrates a reception unit 70 of FIG. 15.

FIG. 15 is a block diagram of the switch unit 20 in the third embodiment. Both the asynchronous and synchronous ports 23A and 23B are connected to the cell access controller 33. The cell information in the respective channels outputted from the separator 22 to the signal lines 30-1 to 30-16 is inputted via the reception units 70-1 to 70-16 to the cell access controller 33. For example, as shown in FIG. 16, each reception unit 70 includes an extractor 510 similar to the input stage of the synchronous processor 20B described with reference to FIG. 13, an elastic buffer memory 520 having a larger data capacity than the buffer 52, a stuff controller 530, a PLL 540, and a frequency dividing counter 550. Clocks of 8 KHz and 149.76 MHz outputted from one of 16 reception units 70-1 to 70-16 are delivered to the synchronous port 23B.

Figure 17:
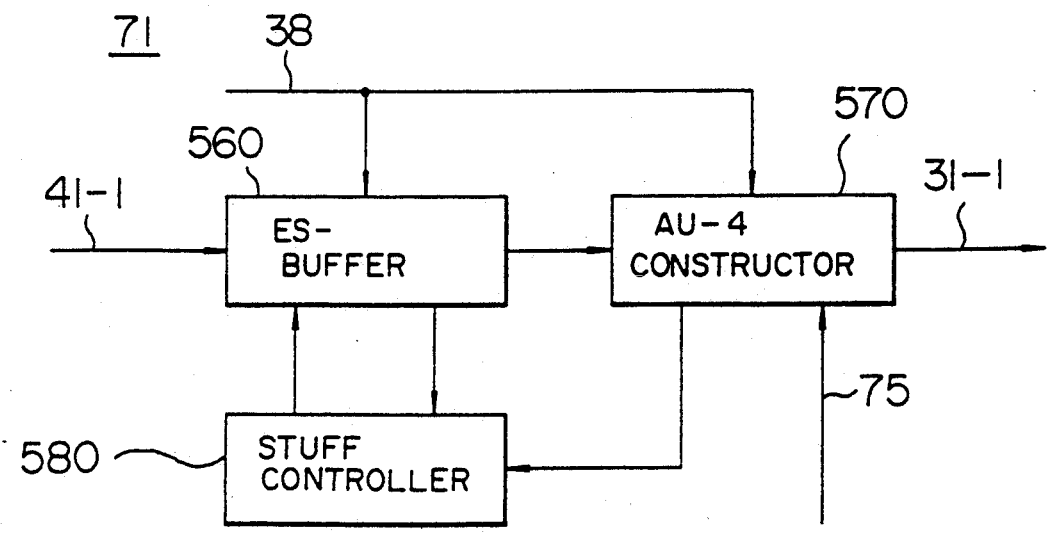
FIG. 17 particularly illustrates a transmission unit 71 of FIG. 15.

The outputs from the cell access controller 33 are inputted to the multiplexer 24 via transmission units 71-1 to 71-16. For example, as shown in FIG. 17, transmission unit 71 includes an elastic buffer memory 560 similar to the latter stage of the synchronous processor 20B described with reference to FIG. 13, an AU-4 constructor 570 and a stuff controller 580. In FIG. 15, the central supervisory node uses as a container generating timing signal 75 a clock signal of 8 KHz obtained by dividing the external pull-in clock 72 while multiple service nodes use the head information 76 of the received container.

Therefore, the central supervisory node sends a container irrespective of the transmission timing of the SONET frames sent, so that no adjustment is required using a buffer such that the delay in the ring is an integer times 125 μsec.

Figure 18:
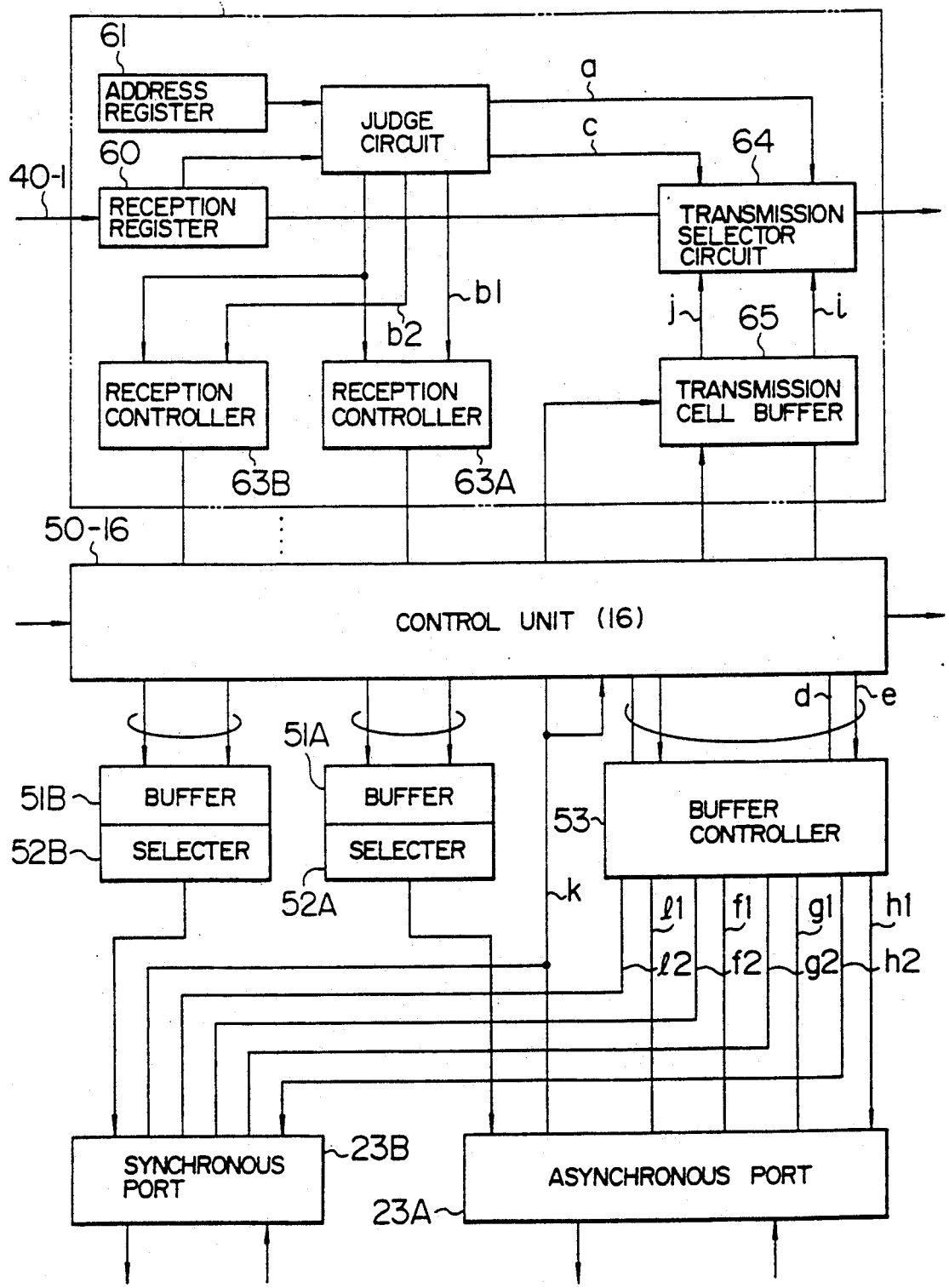
FIG. 18, particularly illustrates a cell access controller 33 of FIG. 15.

FIG. 18 illustrates the structure of the cell access controller 33 in the particular embodiment in which a reception controller 63B, a buffer 51B and a selector 52B for the synchronous port 23B are added to the circuit structure shown in FIG. 11 in order to branch data to ports 23A and 23B. Data on the addresses of the ports 23A and 23B is stored in the address register 61, and the judge circuit 62 outputs a signal b1 if the received cell is destined for the asynchronous port, and outputs a signal b2 if the received cell is destined for the synchronous port.

The buffer controller 53 is connected to the two ports 23A and 23B via control signal lines h1 and h2, respectively, and selectively writes the transmitted cell information from the respective ports via data line k into the transmission cell buffer 65 in the channel designated by the signal line l1 or l2.

Figure 19:
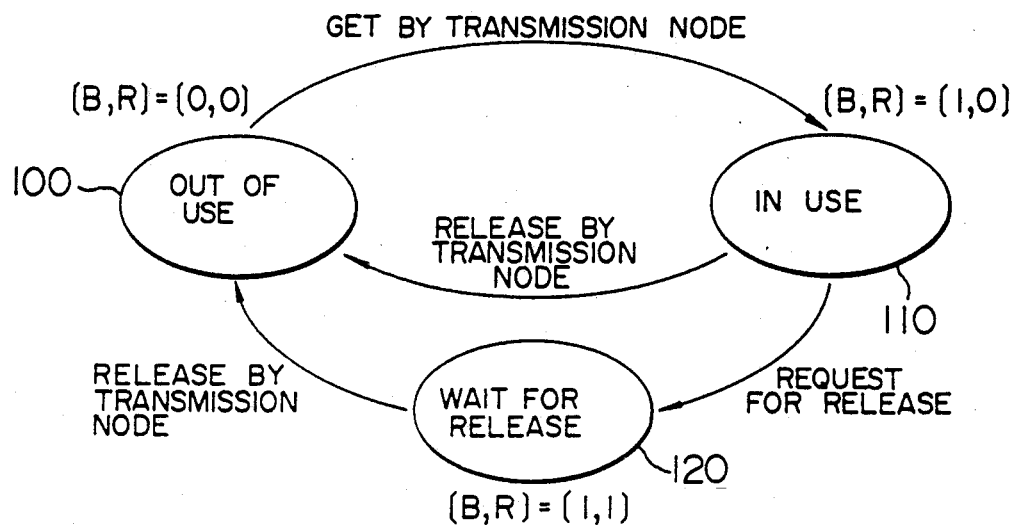
FIG. 19 is a state transition diagram of a slot in a container 20.

FIG. 19 illustrates the state transition of a slot in the container 20 described with reference to FIG. 5 and written in a SONET frame and transmitted. When the transmission node acquires a slot in an empty or out-of-use state 100, the slot changes to an in-use status 110. When the slot in the in-use state goes round the ring transmission path 2 and is released at the transmission node, it returns to the out-of-use state 100. If any node makes a request for release of the slot in the in-use state 110, the slot changes to a wait-for-release state 120. When the slot is released from the transmission node, it shifts to the out-of-use state 100.

Figure 20:
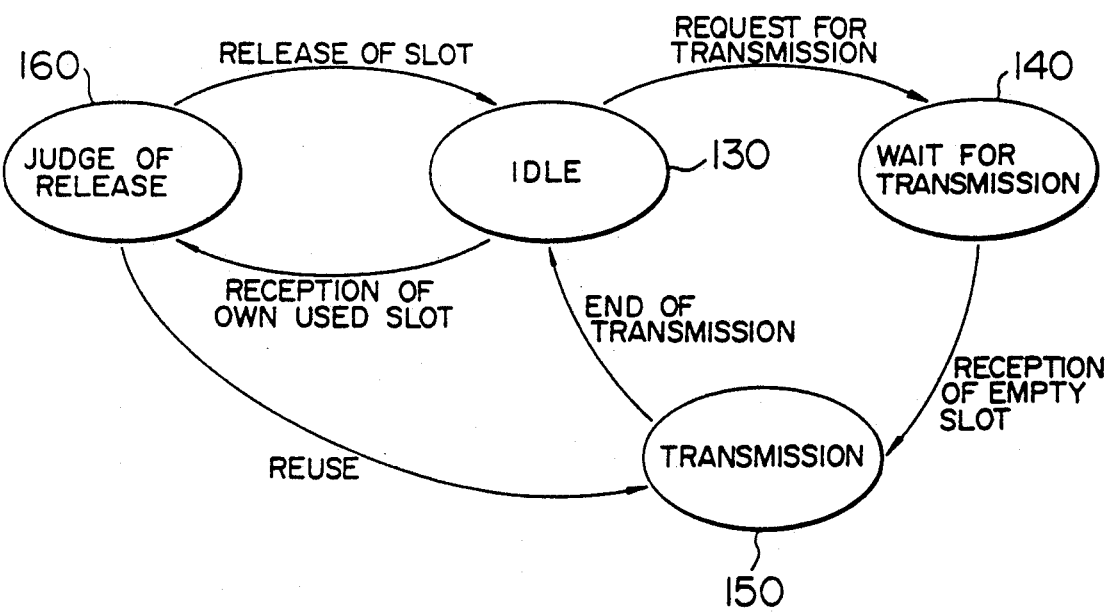
FIG. 20 is a state transition diagram of a node device.

FIG. 20 illustrates the state transition of the node. When a node in an idle state 130 receives a request for transfer of information from the user device interface 23, it is put into a wait-for-transmission state 140 to wait for the acquisition of a right to accessing an empty slot. If the node receives (acquires a right to access) an out-of-use slot, it is put into a transmission state 150 to transfer information. If it completes the transfer, it returns to the idle state 130. If a slot containing the information transmitted by the node returns by going round the transmission path, the node is placed into a relief judge state 160 to judge whether the slot should be released or not. If the slot contains a bit indicative of a request for release set by another node (17L in FIG. 6), or no information to be transmitted, the node releases or empties the slot, and is put into an idle state 130. If there is no request for release contained and the information to be transmitted still remains, the node returns to the transmission state 150 in order to use the slot again.

Figure 21:
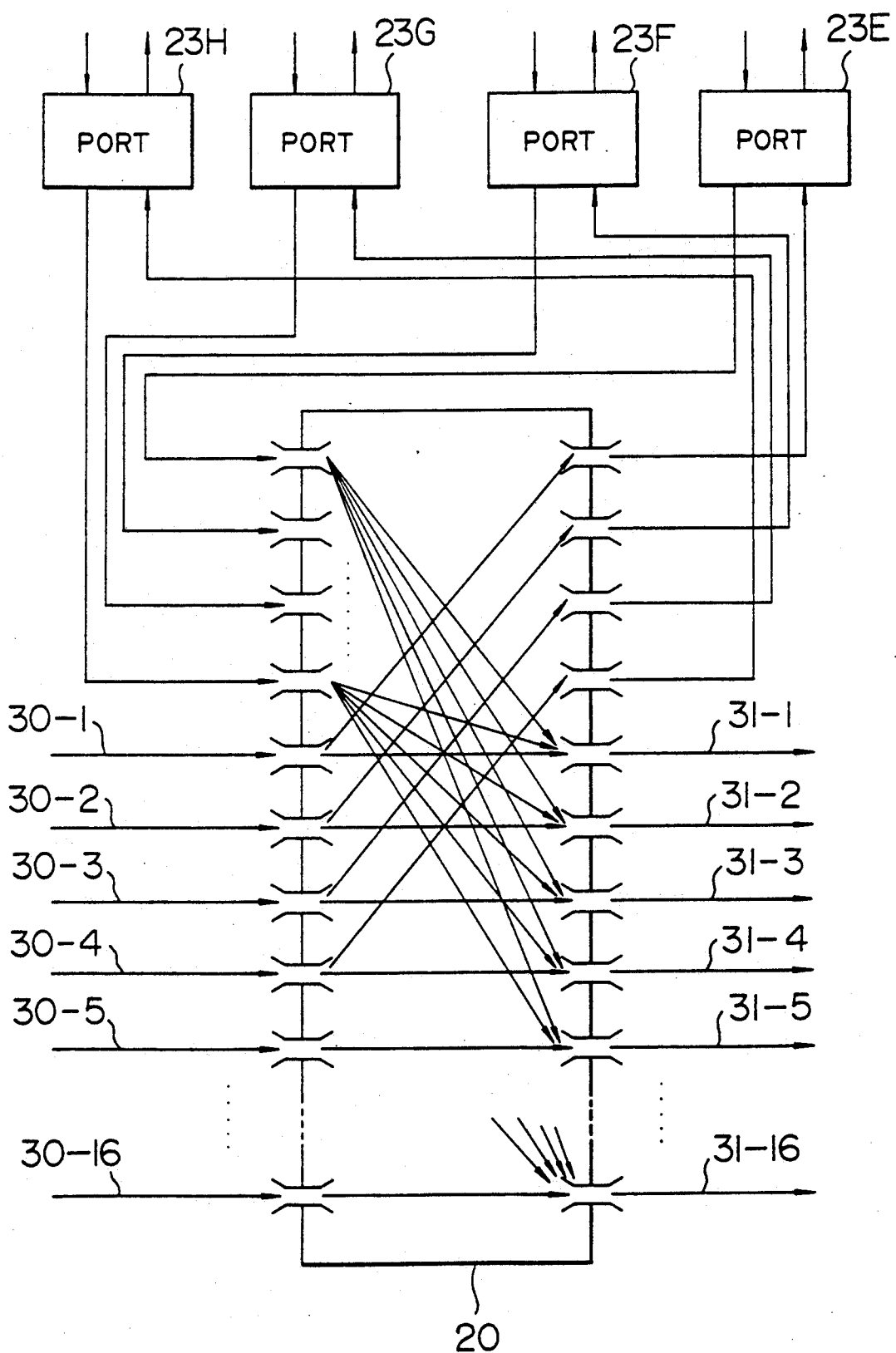
FIG. 21 illustrates the function of a fourth embodiment of the switch unit 20.

FIG. 21 illustrates a modification of the switch unit 20. In the particular example, four ports 23E-23H are provided, each port being assigned special-purpose input channels 30-1 to 30-4 such that the transmitted cell information from each port is selectively outputted to any on of the output channels 31-1 to 31-16. As just described above, if one port is arranged to receive cell information from only a particular input channel, for example, the buffers 51A, 51B, and selectors 52A and 52B of FIG. 18 may be omitted or simplified.

Figure 22:
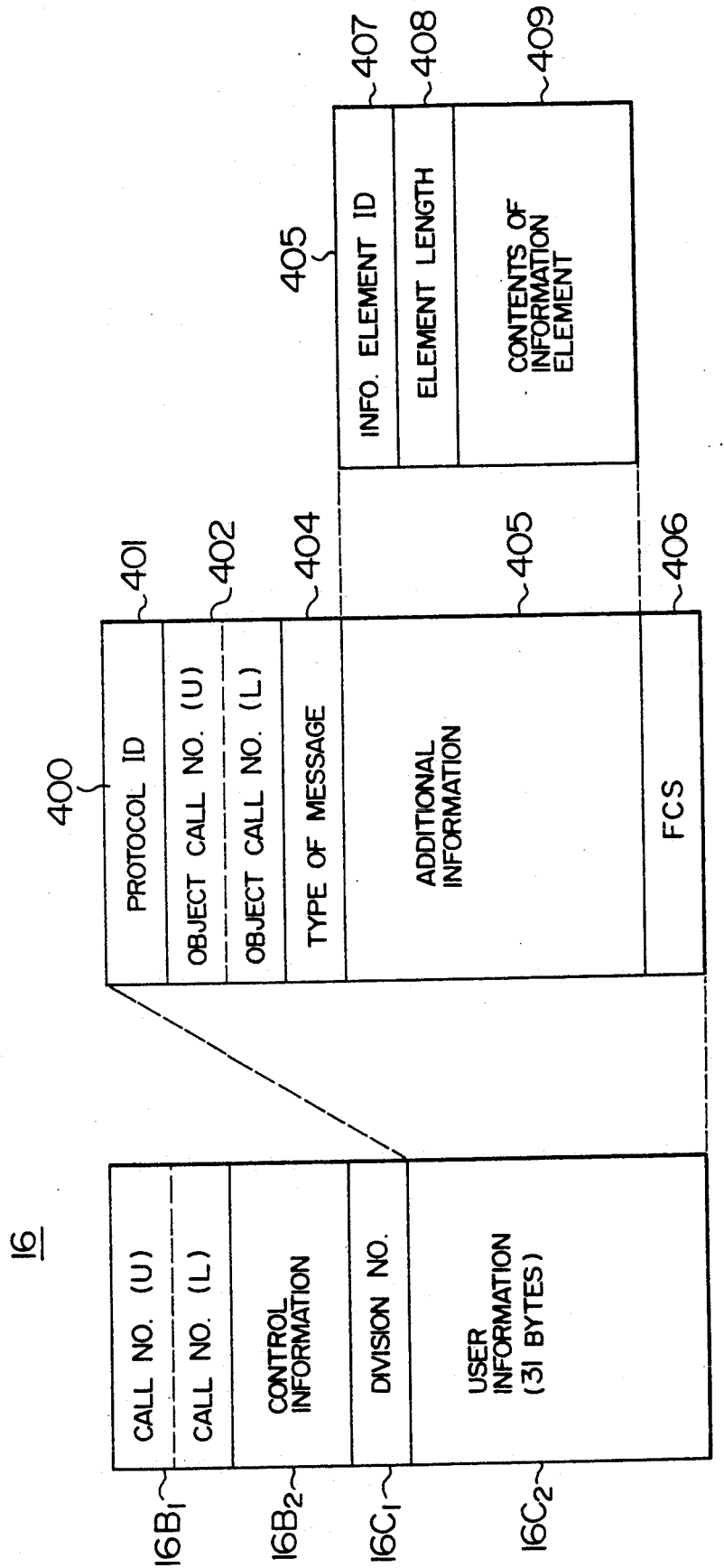
FIG. 22 illustrates the structure of another cell.

FIG. 22 illustrates one example of another format of the cell 16, which includes a header portion 16B of 4 bytes and an information portion 16C of 32 bytes, the header portion 16B including a call number $16B_1$ of 2 bytes and control information $16B_2$ of 2 bytes. The information portion 16C includes a division number area $16C_1$ and a user information area $16C_2$, the division number area $16C_1$ including 2 bits indicative of which of the header, middle portion and end of the user frame divided into a plurality of slots the cell (slot) of the division number area $16C_1$ corresponds to, and 6 bits indicative of the length of valid information in the slot.

When call setting information is to be transmitted in an outband, call setting information 400 is set in the user information area $16C_2$. The call setting information 400 includes an identifier 401 indicative of the kind of a protocol, an object call number 402 indicative of an object to be on or from which a call is set or released, the type of a message 404, additional information 405, and an FSC 406. The additional information 405 includes an information element identifier 407, information element length 408, and information contents 409.

When data is transferred, the call number given by the call setting is set in the area $16B_1$, and information for detection of an error in the call number and information indicative of a priority level are set in the control information area $16B_2$.

As will be obvious from FIG. 8, the switch unit 20 receives cells of fixed length from a plurality of input signal lines 30-1 to 30-17, and selectively outputs these cells to the output signal lines 31-1 to 31-17 in accordance with the destination addresses or call numbers of the cells. Therefore, a well-known ATM (Asynchronous Transfer Mode) switch having a function of switching cells of fixed lengths is applicable to the switch unit.

Figure 23:
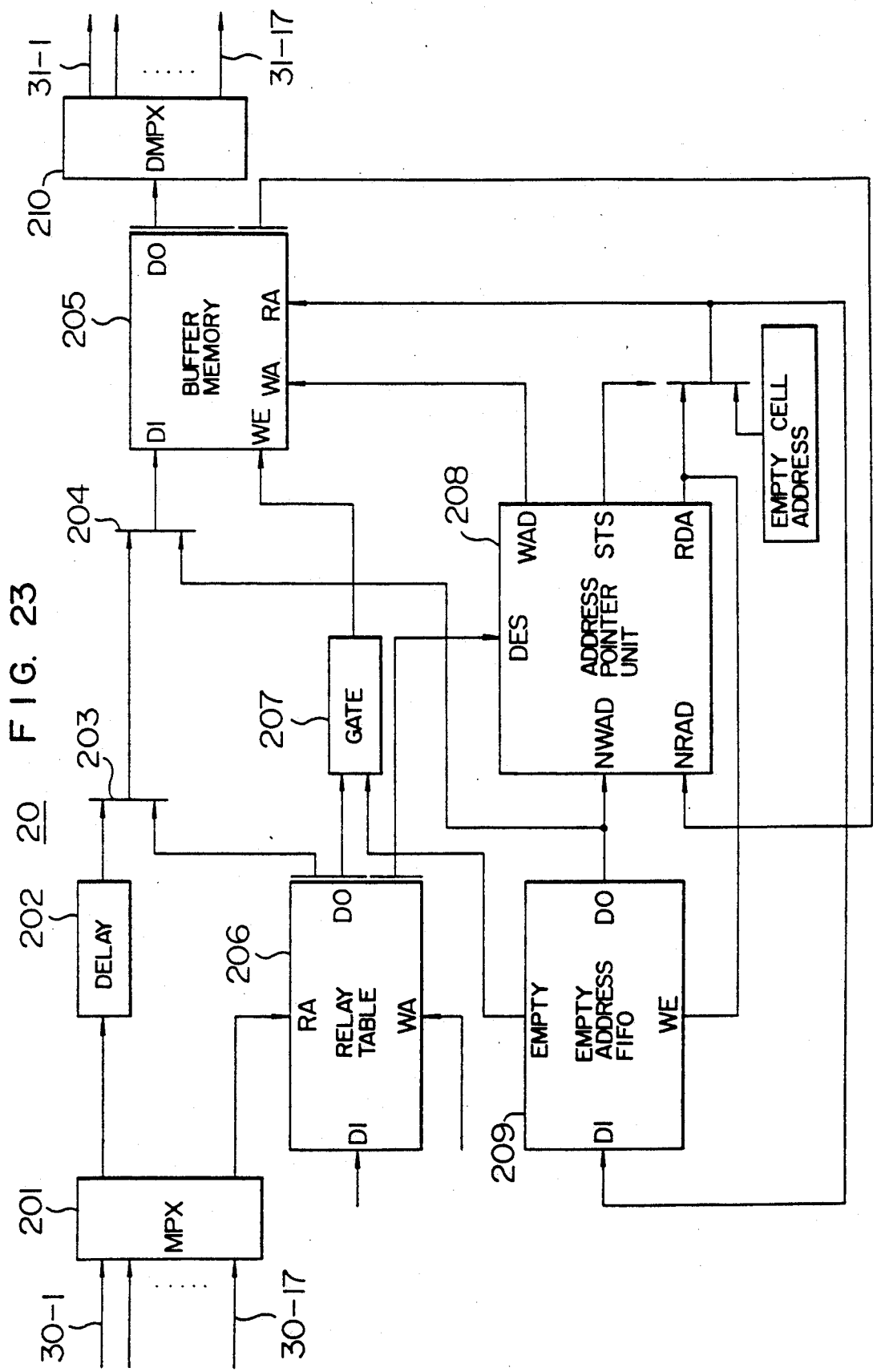
FIG. 23 illustrates another embodiment of the switch unit 20.
Figure 24A:
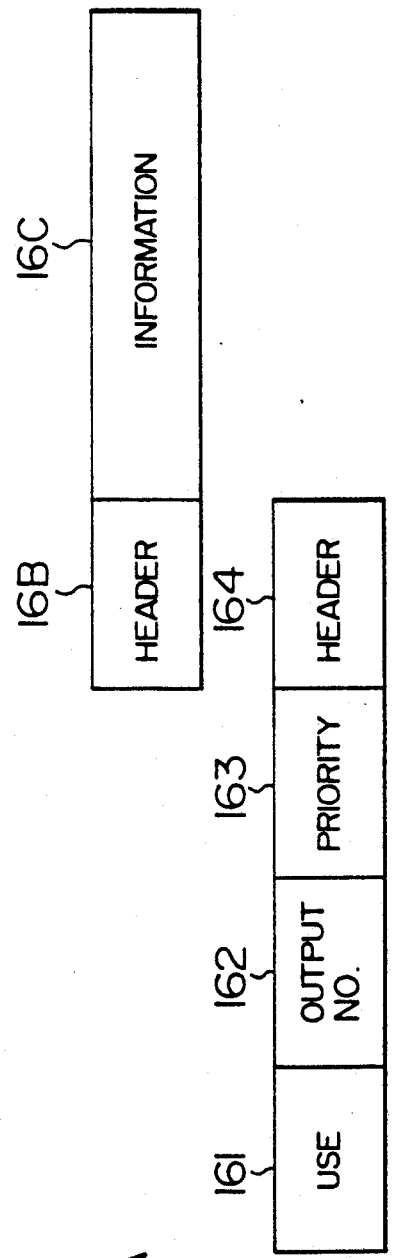
FIG. 24A illustrates the format of a received cell in FIG. 23.
Figure 24B:
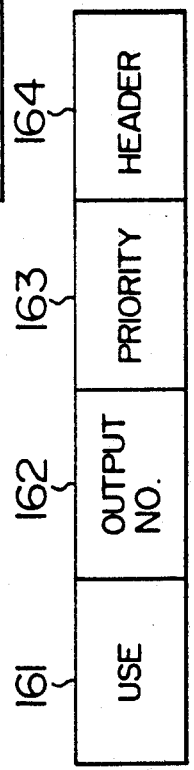
FIG. 24B illustrates a format of data records stored in a memory 206 of FIG. 23.
Figure 24C:
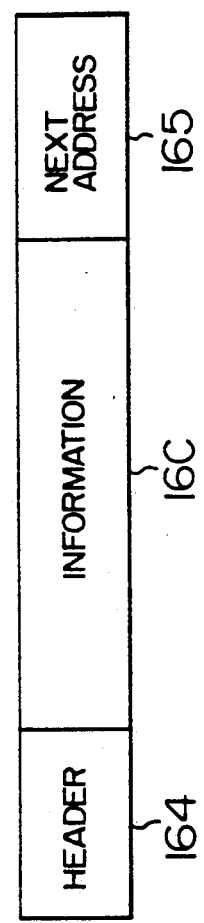
FIG. 24C illustrates a format of data records stored in a memory 205 of FIG. 23.

FIG. 23 illustrates the basic structure of a switch unit 20 having an ATM switch structure. A header portion 16C and information portion 16B are separated from a plurality of cells (FIG. 24A) received in parallel from the input signal lines 30-1 to 30-17 by a multiplexer 201. The information portion 16C is inputted via a delay circuit 202, gates 203 and 204 to a data input terminal of a buffer memory 205. The header portion 16B is inputted to a read address terminal of a relay table (header conversion table) memory 206. As shown in FIG. 24B, the relay table memory 206 stores at addresses corresponding to the header portion 16B records of information 161 indicative of whether the slot is in use or not, an output line number 162, a priority level 163, and a new header 164. The new header 164 and information in use 161 of the data read from the relay table 206 are combined with the information portion 16C outputted from the multiplexer 201 by the gate 203. At this time, a write enable signal is delivered to a write enable terminal WE of the buffer memory via the gate 207, and the output line number 162 is inputted to a destination output line number (DES) terminal of the address pointer unit 208. If the cell supplied by the multiplexer 201 is an empty one, no write enable signal is outputted. The write enable signal is inputted to the buffer memory 205 only when there is an empty address in the empty address FIFO (First-in First-out) memory 209. The address pointer unit 208 outputs to an empty area of the buffer memory 205 a write address (WAD) to write therein a cell record including a new header portion 164, an information portion 16C and the next address 165 and outputs to the buffer memory an address (RDA) of a cell record to be read from the buffer memory 205, as shown in FIG. 24C.

The write address (WAD) used is the one read from an empty address FIFO 209 which stores an empty address in the common buffer memory and inputted to the next write address (NWAD) terminal. The next write address read from the FIFO 209 is combined with the cell information by the gate 204, so that a record having a format of FIG. 28C is inputted to the buffer memory 205.

The address pointer unit 208 includes a memory to store a read address (RDA) corresponding to an outgoing line number (DES), and sequentially scans the memory in the sequence of the outgoing line numbers to deliver read addresses (RA) sequentially to the buffer memory 205. The header portion 164 and information portion 16C of the data records read from the buffer memory 205 are inputted to the separator (demultiplexer) 210 and outputted to the signal lines 31-1 to 31-17. The next address 165 is inputted as the next read address (NRAD) to the address pointer unit 208 and stored in the address memory. The read address (RDA) outputted from the address pointer unit 208 is inputted to the empty address FIFO 209 for use in writing a cell record received thereafter.

The switching operation, mentioned above, presumes the use of a well-known ATM switch. However, in the switch unit 20, the call number used in a new header 164 may be the same as that of the header 16B of the received cell.

We claim:

1. A ring LAN system comprising:
    at least one ring-like transmission path for transmitting a plurality of transmission frames having a predetermined signal transmission rate and comprising at least one control information area for carrying control information for data transmission and at least one data area for carrying a container frame divided into a plurality of fixed length time slots; and
    a plurality of node devices interconnected by the ring-like transmission path, each node device including:
    at least one interface means for connecting a subsystem to said ring LAN system,
    means for extracting the container frame from the data area of each of said transmission frames received from said ring-like transmission path,
    means for generating a plurality of new transmission frames at the predetermined signal transmission rate based on a clock signal generated by a local clock generator located in the node device,
    means connected to said interface means, said extracting means and said generating means, for exchanging data packets of a fixed length between said interface means and the container frames derived from said extracting means and for transferring the container frames carring said exchanged data packets to said new transmission frames generated by said generating means, and
    means for transmitting said new transmission frames to said ring-like transmission path.

2. A ring LAN system according to claim 1, wherein each of said node device further comprises:
    means for adjusting the location of the first byte of the container frames on said new transmission frames according to a difference of the signal transmission rates of the received transmission frames and said new transmission frames.

3. A ring LAN system according to claim 2, wherein each of said new transmission frames includes control information indicating the location of the first byte of the container frames transferred thereto.

4. A ring LAN system according to claim 1, wherein said exchanging means comprises:
    means for temporarily storing at least one data packet to be carried by the container frames transferred to said new transmission frames; and
    means for adjusting the location of the first byte of each of the container frames on said new transmission frames according to the quantity of data packets stored in said storing means.

5. A ring LAN system according to claim 4, wherein each of said new transmission frame includes control information indicating the location of the first byte of the container frames transferred thereto.

6. A ring LAN system according to claim 1, wherein said generating means includes means for generating each of said new transmission frames within a 125 $\mu$sec. period.

7. A ring LAN system according to claim 2, wherein said generating means includes means for generating each of said new transmission frames within a 125 $\mu$sec. period.

8. A ring LAN system according to claim 3, wherein said said generating means includes means for generating each of said new transmission frames within a 125 $\mu$sec. period.

9. A ring LAN system according to claim 4, wherein said said generating means includes means for generating each of said new transmission frames within a 125 $\mu$sec. period.

10. A ring LAN system according to claim 5, wherein said said generating means includes means for generating each of said new transmission frames within a 125 $\mu$sec. period.

11. A ring LAN system comprising:
    at least one ring-like transmission path for transmitting a plurality of transmission frames having a predetermined signal transmission rate and comprising at least one control information area for carrying control information for data transmission and at least one data area for carrying a container frame divided into a plurality of fixed length time slots; and
    a plurality of node devices interconnected by the ring-like transmission path, each node device including:
    at least one interface means for connecting thereto a subsystem treating synchronous information or asynchronous information,
    means for extracting the container frame from the data area of each of said transmission frames received from said ring-like transmission path,
    means for generating a plurality of new transmission frames at the predetermined signal transmission rate based on a clock signal generated by a local clock generator located in the node device,
    means connected to said interface means, said extracting means and said generating means, for exchanging data packets of a fixed length between said interface means and container frames derived from said extracting means and for transferring the container frames carrying said data packets to said new transmission frames generated by said generating means, and
    means for transmitting said new transmission frames to said ring-like transmission path;
    wherein said exchanging means selectively exchanges data packets between said interface means and said container frames depending upon whether the type of information treated by the subsystem connected to said interface means is synchronous or asynchronous information.

12. A ring LAN system according to claim 11, wherein each of the time slots of said container frames includes at least one indication bit for indicating whether a data packet carried by the time slot is synchronous one or asynchronous one.

13. A ring LAN system according to claim 11, wherein each of said node devices further comprises:
means for adjusting the location of the first byte of the container frames on said new transmission frames according to a difference of the signal transmission rates of the received transmission frames and said new transmission frames.

14. A ring LAN system according to claim 13, wherein each of said new transmission frames includes control information indicating the location of the first byte of the container frames transferred thereto.

15. A ring LAN system according to claim 11, wherein said exchanging means comprises:
means for temporarily storing at least one data packet to be carried by the container frames transferred to said new transmission frames; and
means for adjusting the location of the first byte of each of the container frames on said new transmission frames according to the quantity of data packets stored in said storing means.

16. A ring LAN system according to claim 15, wherein each of said new transmission frames includes control information indicating the location of the first byte of the container frames transferred thereto.

17. A ring LAN system according to claim 11, wherein said generating means includes means for generating each of said new transmission frames within a 125 μsec. period.

18. A ring LAN system according to claim 12, wherein said generating means includes means for generating each of said new transmission frames within a 125 μsec. period.

19. A ring LAN system according to claim 13, wherein said generating means includes means for generating each of said new transmission frames within a 125 μsec. period.

20. A ring LAN system according to claim 14, wherein said generating means includes means for generating each of said new transmission frames within a 125 μsec. period.

21. A ring LAN system according to claim 15, wherein said generating means includes means for generating each of said new transmission frames within a 125 μsec. period.

22. A ring LAN system according to claim 16, wherein said generating means includes means for generating each of said new transmission frames within a 125 μsec. period.

23. A ring LAN system comprising:
at least one ring-like transmission path for transmitting a plurality of transmission frames having a predetermined signal transmission rate and comprising at least one control information area for carrying control information for data transmission and at least one data area for carrying a container frame divided into a plurality of fixed length time slots each for use in data packet transmission, each of said time slots having an access control field for carrying slot access control information, a header field for carrying identifier information of the data packet and an information field for carrying substantial contents of the data packet; and
a plurality of node devices interconnected by the ring-like transmission path, each node device including:
at least one interface means for connecting a subsystem to said ring LAN system,
means for extracting the container frame from the data area of each of said transmission frames received from said ring-like transmission path,
means for generating a plurality of new transmission frames at the predetermined signal transmission rate based on a clock signal generated by a local clock generator provided for each node device,
means connected to said interface means, said extracting means and said generating means, for exchanging data packets of a fixed length between said interface means and time slots of container frames derived from said extracting means depending upon contents of the access control field and header field of the time slots and for transferring the container frames carrying said exchanged data packets to said new transmission frames generated by said generating means, and
means for transmitting said new transmission frame to said ring-like transmission path.

24. A ring LAN system according to claim 23, wherein the access control field of each of said time slots carrying data packets includes at least one bit of classification information for indicating to which of synchronous information, asynchronous information and inter-node control information the contents of said information field corresponds.

25. A ring LAN system according to claim 23, wherein the header field of each of said time slots carrying data packets includes a source address and a destination address of the data packet.

* * * * *